(12) United States Patent
Ishii et al.

(10) Patent No.: US 8,794,662 B2
(45) Date of Patent: Aug. 5, 2014

(54) VIBRATION CONTROL STRUCTURE FOR STEERING WHEEL

(71) Applicant: Toyoda Gosei Co., Ltd., Kiyosu (JP)

(72) Inventors: Tsutomu Ishii, Kiyosu (JP); Osamu Hirose, Kiyosu (JP); Norio Umemura, Kiyosu (JP); Mikine Hayashi, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/076,315

(22) Filed: Nov. 11, 2013

(65) Prior Publication Data

US 2014/0131982 A1 May 15, 2014

(30) Foreign Application Priority Data

Nov. 12, 2012 (JP) ................................. 2012-248359
Jul. 24, 2013 (JP) ................................. 2013-153841

(51) Int. Cl.
*B60R 21/16* (2006.01)

(52) U.S. Cl.
USPC ....................................... 280/731; 280/728.2

(58) Field of Classification Search
USPC ............................................. 280/728.2, 731
See application file for complete search history.

(56) References Cited

U.S. PATENT DOCUMENTS

| | | | |
|---|---|---|---|
| 5,350,190 A * | 9/1994 | Szigethy | 280/728.2 |
| 5,410,114 A | 4/1995 | Furuie et al. | |
| 8,286,766 B2 | 10/2012 | Terada et al. | |
| 8,556,292 B2 * | 10/2013 | Umemura et al. | 280/731 |
| 2002/0011721 A1 * | 1/2002 | Kikuta et al. | 280/731 |
| 2004/0090052 A1 * | 5/2004 | Sugimoto | 280/731 |
| 2005/0248135 A1 * | 11/2005 | Poli et al. | 280/731 |
| 2010/0219621 A1 * | 9/2010 | Sasaki et al. | 280/731 |
| 2011/0120258 A1 | 5/2011 | Kondo et al. | |
| 2012/0169032 A1 * | 7/2012 | Sasaki et al. | 280/731 |

FOREIGN PATENT DOCUMENTS

| | | |
|---|---|---|
| JP | H06-191414 A | 7/1994 |
| JP | 2009-202859 A | 9/2009 |
| JP | 2010-202085 A | 9/2010 |
| JP | 2011-110941 A | 6/2011 |
| JP | 2012-158236 A | 8/2012 |

* cited by examiner

*Primary Examiner* — Toan To
(74) *Attorney, Agent, or Firm* — Posz Law Group, PLC

(57) ABSTRACT

A vibration control structure includes a fixed member, an airbag device that is provided at a front portion thereof with a bag holder having a mounting hole and is disposed at a rear side of the fixed member, a horn switch mechanism that includes a support member supported by the fixed member in a state where the horn switch mechanism is inserted through the mounting hole and a slider disposed between the support member and the mounting hole so as to be slidable in the front-rear direction, and an annular elastic member that is disposed on the rear side of the bag holder while being mounted to the outside of the slider. The airbag device serves as a damper mass of a dynamic damper and the elastic member serves as a spring of the damper mass.

9 Claims, 18 Drawing Sheets

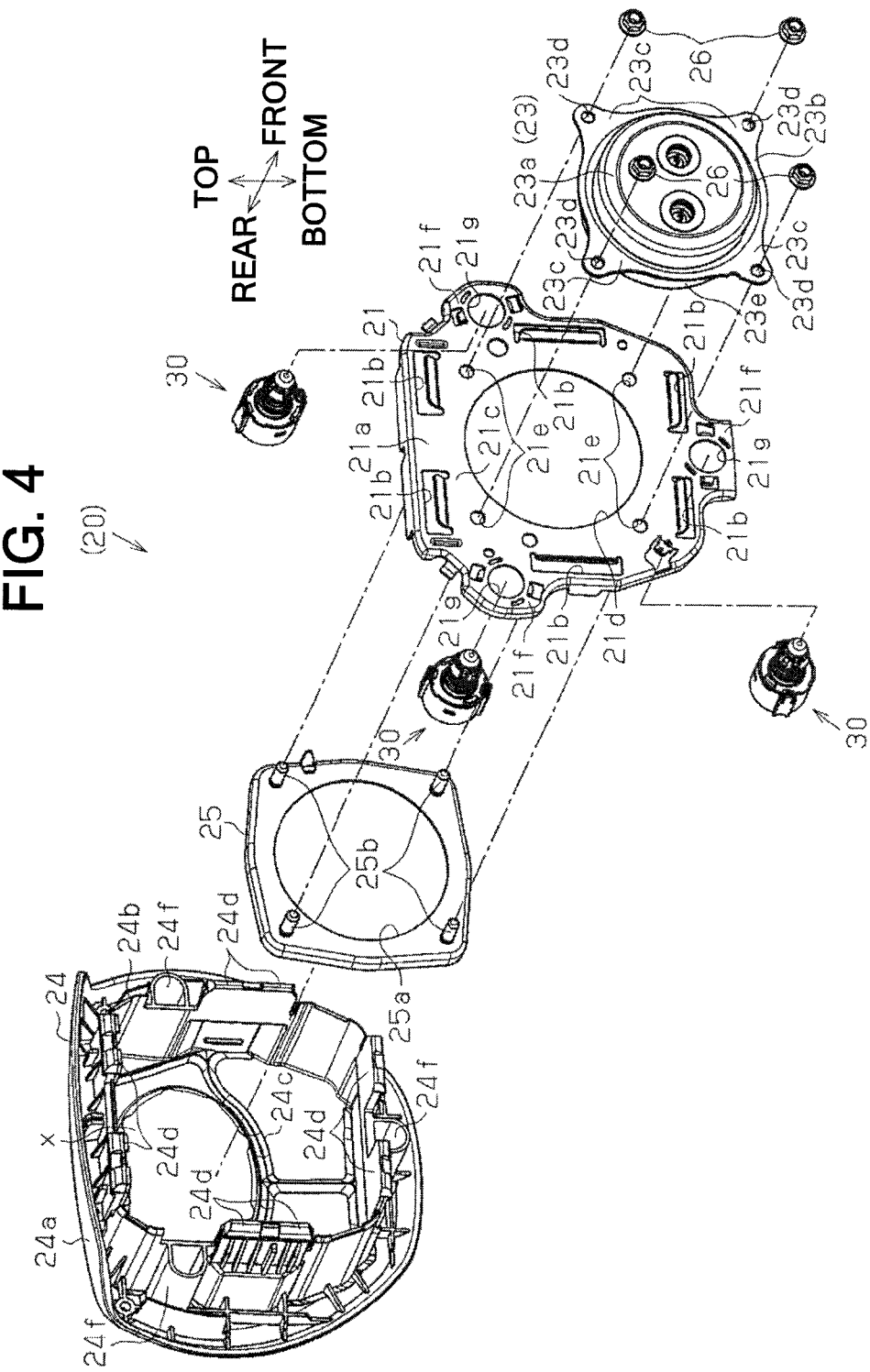

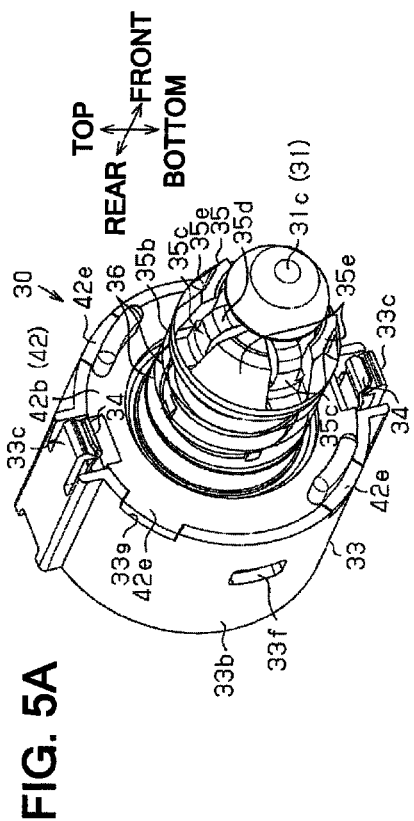
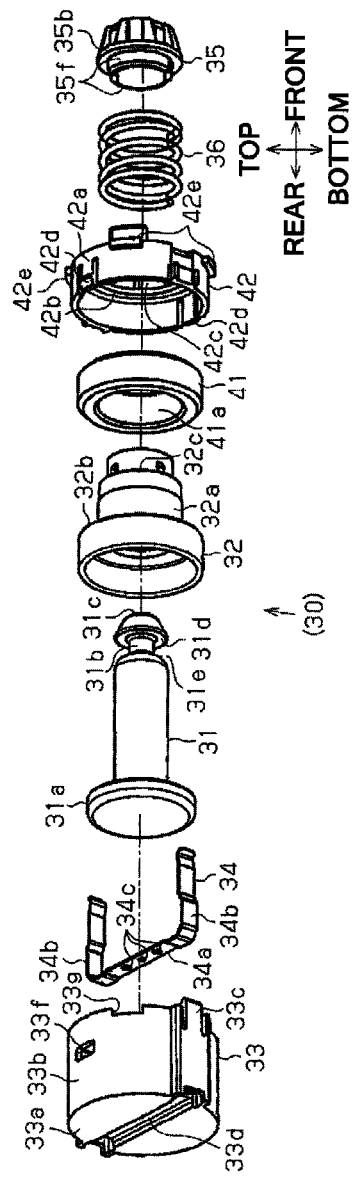
FIG. 5A
FIG. 5B

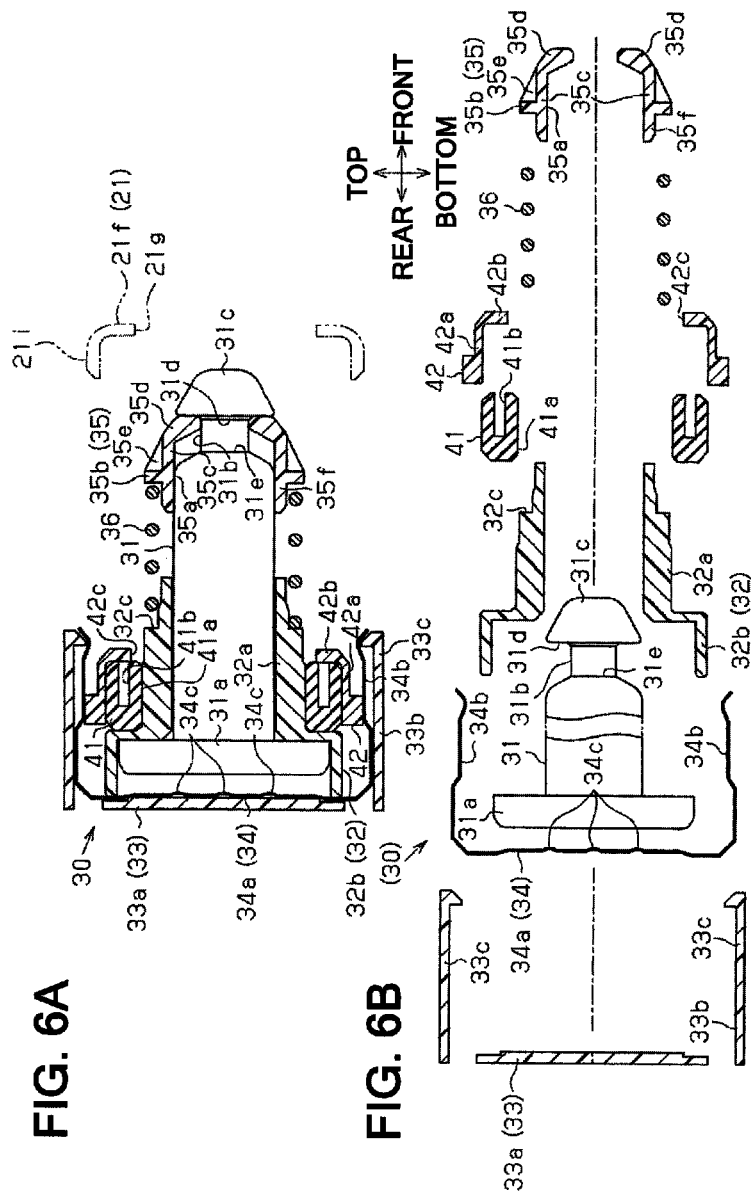

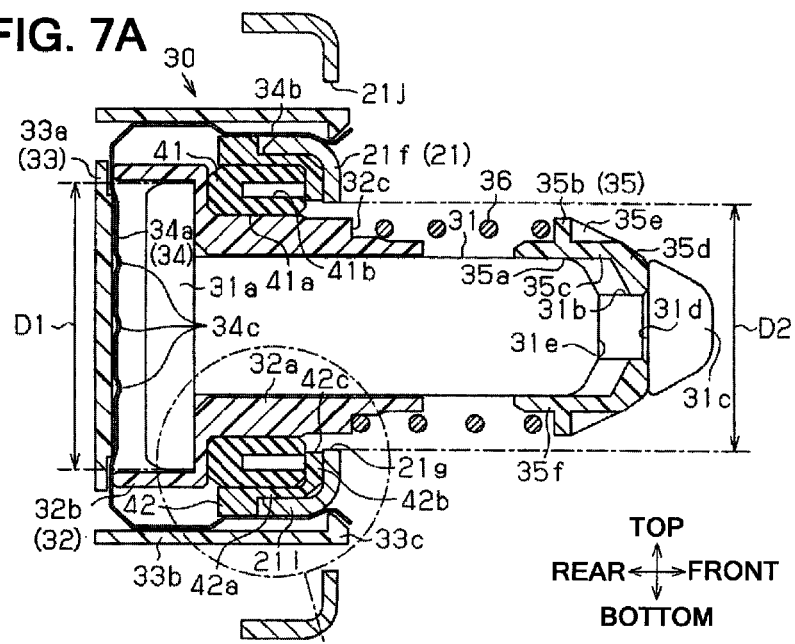
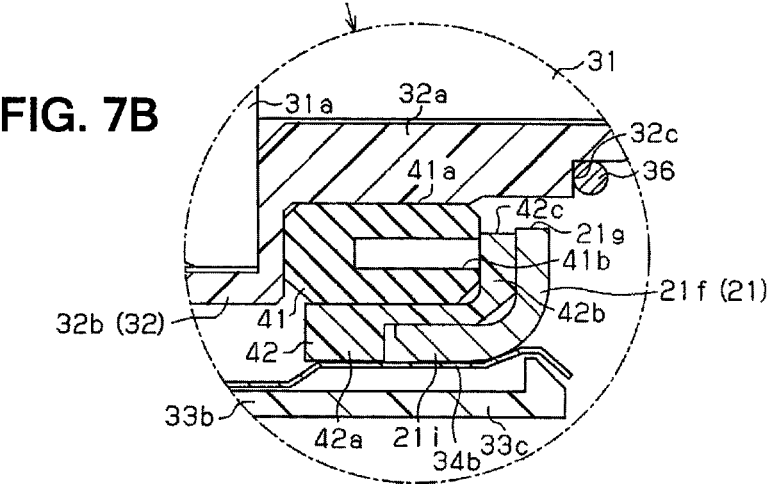

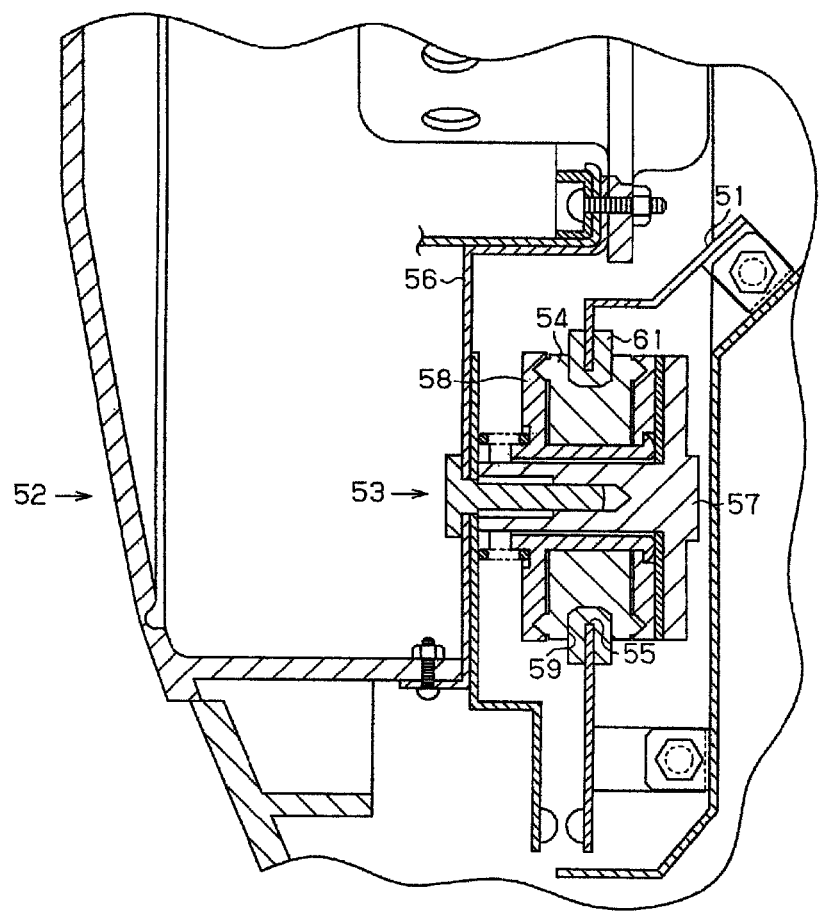

US 8,794,662 B2

VIBRATION CONTROL STRUCTURE FOR STEERING WHEEL

CROSS-REFERENCE TO RELATED APPLICATION

This application claims the benefit of Japanese Patent Application Nos. 2012-248359 (filed on Nov. 12, 2012) and 2013-153841 (filed on Jul. 24, 2013), the entire contents of which are hereby incorporated by reference.

BACKGROUND

1. Technical Field

The present invention relates to a vibration control structure for suppressing (controlling) vibration of a steering wheel in which an airbag device is incorporated.

2. Related Art

When vibration in a vertical direction or lateral direction is transmitted to a steering wheel during high-speed travelling of a vehicle or idling of an in-vehicle engine, the vibration is transmitted to a driver through his hands grasping the steering wheel and therefore a comfortable driving may be impaired. For this reason, techniques for suppressing (controlling) vibration of the steering wheel have been developed and proposed in the prior art. Among these techniques, there is a technique that uses a dynamic damper composed of a weight and an elastic member for supporting the weight on a cored bar or the like of the steering wheel. According to this technique, when vibration of frequency being the same or close to the specific resonance frequency of the dynamic damper is transmitted from the steering wheel to the dynamic damper, the dynamic damper is resonated to absorb the vibration energy of the steering wheel. With this absorption, the vibration of the steering wheel is suppressed (controlled).

Meanwhile, an airbag device is incorporated in the steering wheel so as to protect a driver at the time of collision of a vehicle or the like. The airbag device includes an airbag and an inflator for supplying gas to the airbag. In the airbag device, the airbag is inflated rearward by the gas supplied from the inflator at the time of collision of a vehicle or the like and therefore a driver is protected from impact.

Here, since the airbag device occupies a substantial portion of an internal space of the steering wheel, it is difficult to incorporate the above-described dynamic damper in a recent steering wheel.

Therefore, a steering wheel has been proposed in which an airbag device serves as a dynamic damper (for example, see JP-A-2012-158236).

As shown in FIG. 18, the steering wheel includes a fixed member (horn plate) 51, an airbag device 52, a horn switch mechanism 53 and an elastic member 54. The fixed member (horn plate) 51 is fixed to a steering shaft (not shown) extending in a longitudinal direction (front-rear direction) and has a mounting hole (opening) 55. The airbag device 52 includes a bag holder (base plate) 56 and is disposed on the rear side of the fixed member (horn plate) 51.

The horn switch mechanism 53 includes a support member (guide member) 57 and a slider (bush) 58. The support member (guide member) 57 extends forwardly in a state of being mounted to the bag holder (base plate) 56 and is inserted through the mounting hole (opening) 55 of the fixed member (horn plate) 51. The slider (bush) 58 is disposed between the support member (guide member) 57 and the mounting hole (opening) 55 so as to be slidable in a longitudinal direction (front-rear direction). In the horn switch mechanism 53 with such a configuration, a horn device is actuated by a relative movement between the slider (bush) 58 and the bag holder (base plate) 56 due to a pressing operation of the airbag device 52.

The elastic member 54 has an annular shape and is mounted to the slider (bush) 58. The elastic member 54 is mounted to the fixed member (horn plate) 51 at the mounting hole (opening) 55.

Meanwhile, the part names in parentheses correspond to the part names that are used in JP-A-2012-158236.

According to the above-described steering wheel, the airbag device 52 serves as a damper mass of the dynamic damper and the elastic member 54 serves as a spring of the dynamic damper. Therefore, when the steering wheel is vibrated at a predetermined frequency in a direction (such as a vertical direction or a lateral direction) perpendicular to a steering shaft, the elastic member 54 is vibrated together with the airbag device 52 in a direction perpendicular to the steering shaft while being elastically deformed at a resonance frequency that is the same or close to the predetermined frequency, thereby absorbing the vibration energy of the steering wheel. With this absorption, the vibration of the steering wheel is suppressed (controlled).

However, in a configuration disclosed in JP-A-2012-158236, in order to mount the elastic member 54 to the fixed member (horn plate) 51, a groove 59 is provided in an outer peripheral portion of the elastic member 54 and fitted to an insulator 61 mounted to the mounting hole (opening) 55. For this reason, in a structure where the elastic member 54 is mounted to the fixed member (horn plate) 51 only at the outer peripheral portion thereof as described above, it is hard to say that the mounting strength of the elastic member 54 relative to the fixed member (horn plate) 51 is sufficiently high. Further, since the elastic member 54 having an outer diameter greater than an inner diameter of the mounting hole (opening) 55 is mounted to the mounting hole (opening) 55, an operation for mounting the elastic member 54 to the fixed member (horn plate) 51 is complicated.

The present invention has been made in consideration of the above-described situations and an object thereof is to provide a vibration control structure for a steering wheel, which is capable of mounting an elastic member with high strength by performing a simple operation.

SUMMARY

<1> A vibration control structure for a steering wheel includes:
a fixed member that is fixed to a steering shaft extending in a front-rear direction;
an airbag device that is provided at a front portion thereof with a bag holder having a mounting hole and is disposed at a rear side of the fixed member;
a horn switch mechanism that includes a support member supported by the fixed member in a state where the horn switch mechanism is inserted through the mounting hole and a slider disposed between the support member and the mounting hole so as to be slidable in the front-rear direction, the horn switch mechanism being adapted to actuate a horn device by a forward movement of the slider according to a pressing operation of the airbag device; and
an annular elastic member that is disposed on the rear side of the bag holder while being mounted to the outside of the slider,
wherein the airbag device serves as a damper mass of a dynamic damper and the elastic member serves as a spring of the damper mass, and the elastic member is sandwiched by the bag holder and the slider from a front side and a rear side thereof and from an outside and inside of the radial direction.

In the vibration control structure for the steering wheel with the above configuration <1>, the airbag device serves as a damper mass of the dynamic damper and the elastic member serves as a spring of the dynamic damper. Therefore, when the steering wheel is vibrated at a predetermined frequency in a direction perpendicular to a steering shaft, the elastic member is vibrated (the airbag device and elastic member are resonated) together with the airbag device in a direction perpendicular to the steering shaft while being elastically deformed at a resonance frequency that is the same or close to the predetermined frequency, thereby absorbing the vibration energy of the steering wheel. With this absorption, the vibration of the steering wheel is suppressed (controlled).

Further, in the above steering wheel, the slider moves forward on the support member supported by the fixed member and the horn device is actuated when the airbag device is pressed.

During the production of the above steering wheel, the horn switch mechanism is assembled to the airbag device via the elastic member. At this time, the elastic member is sandwiched by the bag holder and the slider from the front and rear thereof. Further, the elastic member is sandwiched by the bag holder and the slider from the outside and inside of the radial direction. In this way, the periphery of the annular elastic member is surrounded by the bag holder and the slider, so that the movement of the elastic member in a longitudinal direction (front-rear direction) and radial direction is restricted. As a result, the mounting strength of the elastic member is increased, as compared to a case where the elastic member is mounted only at an outer peripheral portion thereof. Further, when mounting the elastic member, it is sufficient only to sandwich the elastic member by the bag holder and the slider from the longitudinal direction (front-rear direction) and radial direction, as described above.

<2> In the vibration control structure for the steering wheel of <1>, the bag holder includes a mounting portion disposed around the mounting hole and intersecting the bag holder along the front-rear direction, the slider includes a cylindrical portion through which the support member is inserted and an enlarged diameter portion formed in an outer periphery of the cylindrical portion and having a diameter greater than that of the cylindrical portion, and the elastic member is sandwiched by the mounting portion and the enlarged diameter portion from the front side and the rear side of the elastic member.

According to the above configuration <2>, the elastic member is sandwiched by the mounting portion of the bag holder and the enlarged diameter portion of the slider from the front and rear thereof. Forward movement of the elastic member is restricted by the mounting portion and rearward movement thereof is restricted by the enlarged diameter portion.

<3> In the vibration control structure for the steering wheel of <1> or <2>, the bag holder includes a clamping portion extending from a peripheral portion of the mounting hole to the back side of the bag holder, the slider includes a cylindrical portion through which the support member is inserted, and the elastic member is sandwiched by the clamping portion and the cylindrical portion from the outside and inside of the radial direction of the annular elastic member.

According to the above configuration <3>, the elastic member is sandwiched by the clamping portion of the bag holder and the cylindrical portion of the slider from the outside and inside of the radial direction. Outward movement of the elastic member is restricted by the clamping portion and inward movement thereof is restricted by the cylindrical portion.

<4> In the vibration control structure for the steering wheel according to any one of <1> to <3>, a collar portion having a diameter greater than that of the mounting hole is formed at a site of the support member that is located on the rear of the mounting hole.

According to the above configuration <4>, the support member is supported to the fixed member in a state of being inserted through the mounting hole. The collar portion formed at the support member is located rearward of the mounting hole. The collar portion has a diameter greater than that of the mounting hole. Therefore, the collar portion serves as a stopper by coming into contact with the peripheral portion of the mounting hole of the bag holder when the bag holder is moved rearward. In this way, excessive rearward movement of the bag holder, in turn, the airbag device is restricted.

<5> In the vibration control structure for the steering wheel according to any one of <1> to <4>, the horn switch mechanism is mounted to the bag holder by inserting the support member and the slider through the mounting hole in a state where the elastic member is mounted to the outside of the slider and, the vibration control structure for the steering wheel further includes a damper holder for holding the elastic member in a state of being mounted to the outside of the slider by being locked to the horn switch mechanism before the horn switch mechanism is mounted to the bag holder, the damper holder being located between the elastic member and the bag holder when the horn switch mechanism is mounted to the bag holder.

According to the above configuration <5>, since the elastic member is mounted on the outside of the slider of the horn switch mechanism before an operation for mounting the horn switch mechanism to the bag holder is performed, the elastic member is held in a state of being mounted on the outside of the slider by the damper holder locked to the horn switch mechanism. Accordingly, the detachment of the elastic member from the slider is less likely to occur before the operation or during the operation and therefore the operation can be easily performed.

Further, in a state where the horn switch mechanism is mounted to the bag holder, the damper holder is located between the elastic member and the bag holder. Therefore, the damper holder is less likely to affect the fact that the elastic member is sandwiched by the bag holder and the slider from the front and rear thereof and from the outside and inside of the radial direction.

<6> In the vibration control structure for the steering wheel according to any one of <1> to <5>, a portion of the elastic member enters into the mounting hole.

According to the above configuration <6>, when the elastic member is greatly vibrated together with the airbag device while being elastically deformed due to the vibration of the steering wheel and an inner wall surface of the mounting hole of the bag holder is close to the slider, the inner wall surface of the mounting hole is supported by the part of the elastic member that enters into the mounting hole. Further, the inner wall surface of the mounting hole is prevented from coming into contact with the slider by the elastic member. Therefore, even when sound is generated by the contact of the inner wall surface with the elastic member, the sound is smaller than the sound that is generated by the contact of the inner wall surface with the slider, i.e., by the contact between rigid parts. The reason is that the elastic member is elastically deformed by being brought into contact with the inner wall surface of the mounting hole and therefore the generation of sound is suppressed. In this way, the generation of noise is suppressed when a large vibration is transmitted to the steering wheel.

Further, in a case where the damper holder is provided, the damper holder is supported by the elastic member. The damper holder is prevented from coming into contact with the slider by the elastic member. Therefore, even when sound is generated by the contact of the damper holder with the elastic member, the sound is smaller than the sound that is generated by the contact of the damper holder with the slider, i.e., by the contact between rigid parts.

<7> The vibration control structure for the steering wheel according to any one of <1> to <6>, the elastic member includes an inner cylinder portion mounted to the outside of the slider, an outer cylinder portion surrounding the inner cylinder portion and a connecting portion connecting an intermediate portion in the front-rear direction (front-rear direction) of the inner cylinder portion to an intermediate portion in the front-rear direction of the outer cylinder portion.

According to the above configuration <7>, the elastic member is vibrated together with the airbag device while being elastically deformed due to the vibration of the steering wheel. At this time, in the elastic member, the movement of the bag holder is transmitted to the connecting portion via the outer cylinder portion or the movement of the slider is transmitted to the connecting portion via the inner cylinder portion. The connecting portion is elastically deformed by such a transmission and therefore the elastic member serves as a spring of the dynamic damper.

Here, the connecting portion is adapted to connect the intermediate portion in a longitudinal direction (front-rear direction) of the inner cylinder portion and the intermediate portion in a longitudinal direction (front-rear direction) of the outer cylinder portion. In other words, the connecting portion is located at an intermediate portion in a longitudinal direction (front-rear direction) between the inner cylinder portion and the outer cylinder portion. Therefore, the movement of the bag holder is easily transmitted to the connecting portion via the outer cylinder portion or, the movement of the slider is easily transmitted to the connecting portion via the inner cylinder portion. The connecting portion is elastically deformed so that the inner cylinder portion and the outer cylinder portion are substantially parallel to each other. As a result, the dynamic damper can be vibrated in an aimed damping direction and at an aimed damping frequency by tuning the thickness or the like of the connecting portion.

<8> In the vibration control structure for the steering wheel of <7>, the connecting portion is orthogonal to the front-rear direction.

According to the above configuration <8>, the connecting portion is likely to be elastically deformed by being compressed in the radial direction.

<9> The vibration control structure for the steering wheel of <7>, the connecting portion is inclined with respect to the front-rear direction.

According to the above configuration <9>, in addition to being elastically deformed in such a way that the connecting portion is compressed in the radial direction, the elastic member is elastically deformed in such a way that the connecting portion is bent to change an incline angle with respect to a longitudinal direction. In this case, a repulsive force that is generated by the connecting portion due to the elastic deformation becomes smaller, as compared to a case where the elastic member is elastically deformed in such a way that the connecting portion is compressed only in the radial direction.

As a result, the connecting portion is more likely to be elastically deformed and an aimed damping frequency can be set to be lower.

According to the vibration control structure for the steering wheel, it is possible to mount an elastic member with high strength by performing a simple operation.

BRIEF DESCRIPTION OF THE DRAWINGS

FIG. 1A is a side view of the steering wheel and FIG. 1B is a view of the steering wheel, as seen in a direction of an arrow A.

FIG. 4 is an exploded perspective view of the airbag device shown in FIG. 3.

FIG. 5A is a perspective view of a horn switch mechanism or the like in the first embodiment and FIG. 5B is an exploded perspective view of FIG. 5A.

FIG. 6A is a sectional view of the horn switch mechanism or the like in the first embodiment and FIG. 6B is an exploded sectional view of FIG. 6A.

FIG. 7A is a sectional view showing a state where the horn switch mechanism or the like of the first embodiment is assembled to a bag holder and FIG. 7B is a partial enlarged sectional view of FIG. 7A.

FIG. 18 is a partial sectional view showing a vibration control structure for a steering wheel in a related art.

DETAILED DESCRIPTION OF THE PREFERRED EMBODIMENTS

First Embodiment

Hereinafter, a first embodiment of a vibration control structure for a steering wheel will be described with reference to FIG. 1 to FIG. 11.

Figures 1A, 1B:
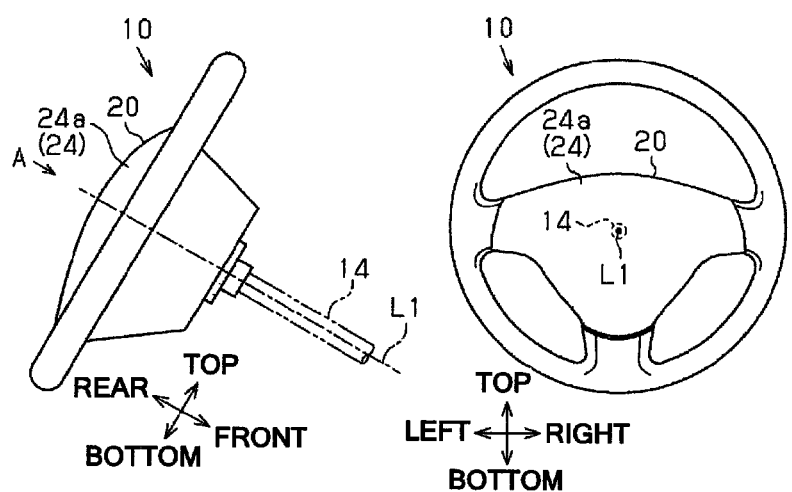
FIGS. 1A and 1B are views showing a first embodiment of a vibration control structure for a steering wheel.

As shown in FIG. 1A, a steering shaft 14 is disposed on a front side (right side in FIG. 1A) of a driver's seat of a vehicle in an inclined state where the steering shaft 14 becomes higher toward the driver's seat side (left side in FIG. 1A). The steering shaft 14 extends in a longitudinal direction (front-rear direction) along an axis L1 and rotates about the axis L1. A steering wheel 10 is mounted to a rear end portion of the steering shaft 14 so as to rotate integrally therewith.

In the first embodiment, each part of the steering wheel 10 will be described with respect to the axis L1 of the steering shaft 14. A direction along the axis L1 is referred to as "a longitudinal direction (front-rear direction)" of the steering wheel 10. And, among the directions along a plane perpendicular to the axis L1, a standing direction of the steering wheel 10 is referred to as "a vertical direction". Accordingly, the longitudinal direction (front-rear direction) and vertical direction of the steering wheel 10 are slightly inclined with respect to the longitudinal direction (horizontal direction) and vertical direction (perpendicular direction) of a vehicle.

In FIG. 3, FIG. 5B, FIGS. 6A and 6B, FIGS. 7A and 7B, FIG. 9, FIG. 10 and FIG. 13 to FIG. 16, for the convenience of description, it is considered that the longitudinal direction (front-rear direction) of the steering wheel 10 is consistent with the horizontal direction and the vertical direction of the steering wheel 10 is consistent with the perpendicular direction.

Figure 2:
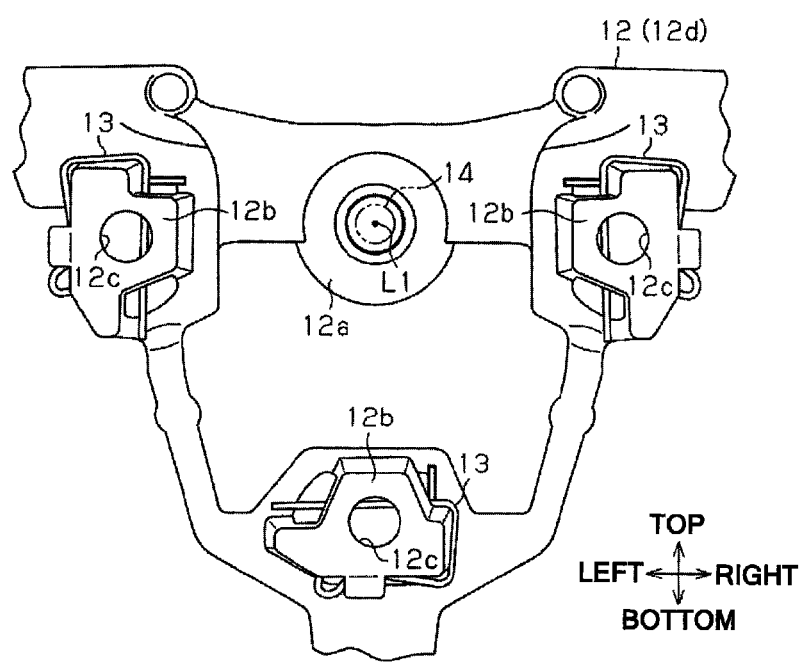
FIG. 2 is a partial front view of a cored bar of the steering wheel in the first embodiment.

As shown in FIG. 1B, the steering wheel 10 includes an airbag device (airbag module) 20 at a center portion thereof. A skeletal portion of the steering wheel 10 is configured by a cored bar 12 as a fixed member. FIG. 2 shows a portion of the cored bar 12. The cored bar 12 is formed of iron, aluminum, magnesium or alloy thereof, etc. The cored bar 12 is mounted to the steering shaft 14 at a boss portion 12a that is located at a center portion thereof. The cored bar 12 is rotated integrally with the steering shaft 14.

Figure 9:
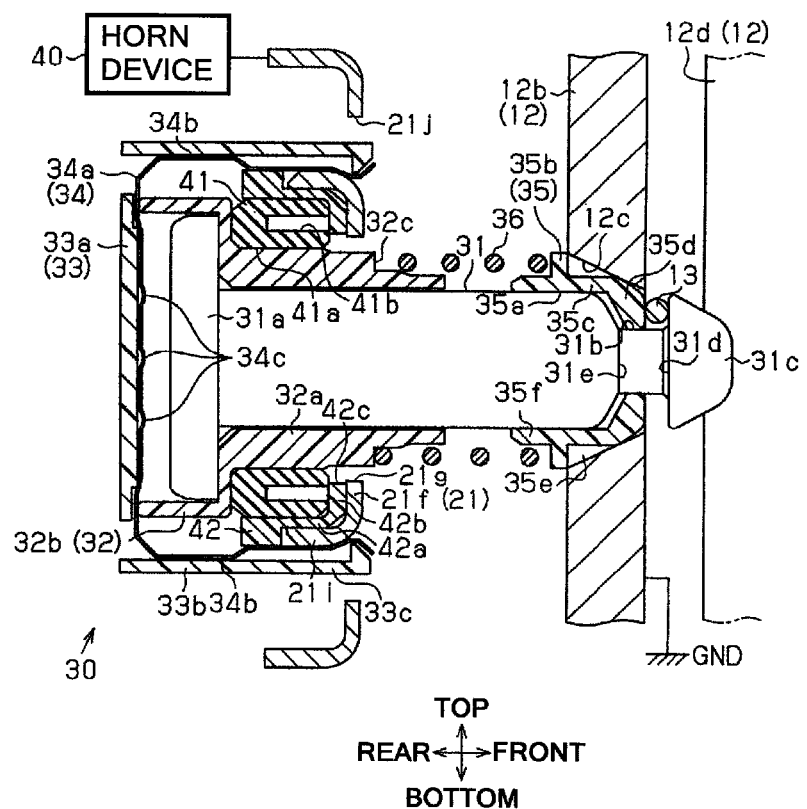
FIG. 9 shows the first embodiment and is a partial sectional view showing an internal structure of the horn switch mechanism or the like in a state of being mounted to the cored bar.

In the cored bar 12, holding portions 12b are provided at a plurality of sites around the boss portion 12a and respectively have a through-hole 12c. In a case where it is necessary to distinguish between the holding portions 12b and the other portions in the cored bar 12, the other portions are referred to as "a cored bar body 12d". As shown in FIG. 9, an inner wall surface of each through-hole 12c has a taper shape whose diameter is increased toward the rear side (left side in FIG. 9). In FIG. 2, the inner wall surface of the taper shape is not shown.

As shown in FIG. 2 and FIG. 9, a clip 13 is respectively incorporated between each holding portion 12b and the cored bar body 12d and in the vicinity of the through-hole 12c. Each clip 13 is formed by bending, into a predetermined shape, a wire material made of a conductive metal such as spring steel. Each clip 13 is held in the cored bar 12 in such a way that the clip is incorporated between the holding portion 12b and the cored bar body 12d while being elastically deformed slightly. A portion of the clip 13, for example, an end portion is in contact with at least one of the holding portion 12b and the cored bar body 12d. The clip 13 has a function of locking a snap pin 31 of a horn switch mechanism 30 (to be described later) to the cored bar 12 in a conductive state. A portion of each clip 13 is located near the front of the through-hole 12c.

A horn device 40 is provided in a vehicle. A plurality of horn switch mechanisms 30 for actuating the horn device 40 is mounted to each holding portion 12b of the cored bar 12 in a snap-fit structure. Each horn switch mechanism 30 has the same configuration. Further, the airbag device 20 is supported on the cored bar 12 via these horn switch mechanisms 30. In this way, each horn switch mechanism 30 has both the supporting function of the airbag device 20 and the function of the horn switch.

Further, in the first embodiment, an elastic member 41 and a damper holder 42 are interposed between each horn switch mechanism 30 and the bag holder 21 of the airbag device 20. A vibration control structure for suppressing (controlling) vibration of the steering wheel 10 is configured by the airbag device 20, the horn switch mechanism 30, the elastic member 41, the damper holder 42, the cored bar 12 and the like.

Next, each part of the vibration control structure will be described.

<Airbag Device 20>

Figure 3:
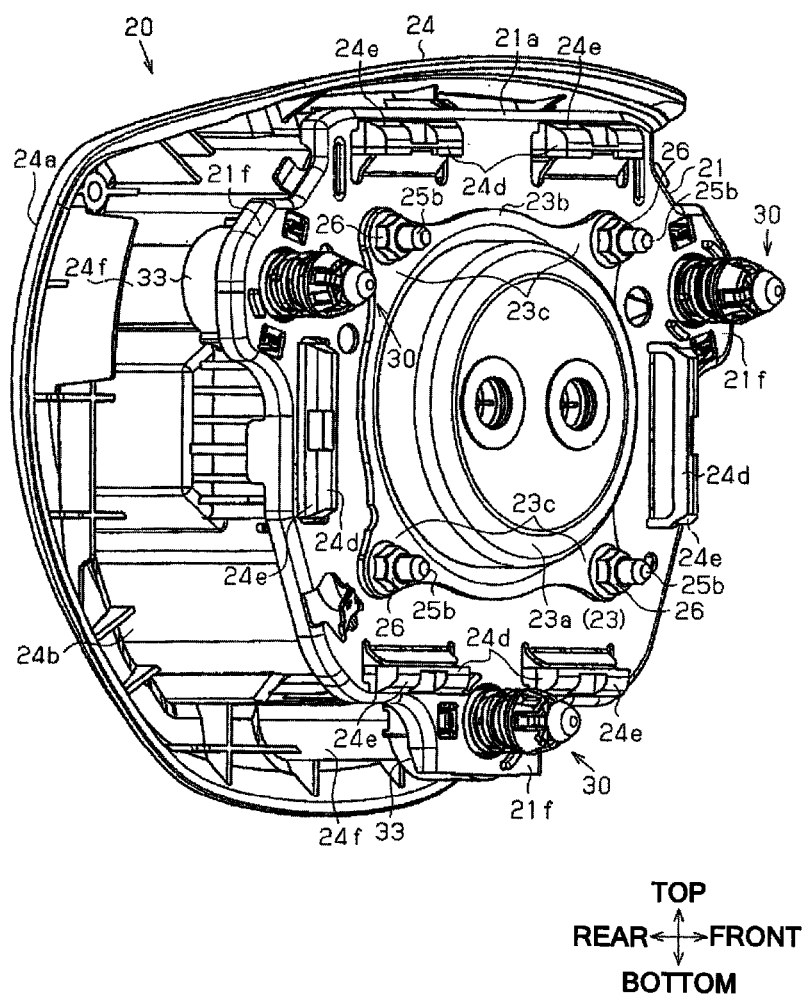
FIG. 3 is a perspective view of an airbag device in the first embodiment.

As shown in FIG. 3 and FIG. 4, the airbag device 20 is configured by assembling a pad part 24, an airbag (not shown) and an inflator 23 to the bag holder 21 that is disposed at the front portion of the airbag device 20. The airbag device 20 is disposed on the rear side of the cored bar 12 (see FIG. 9).

The pad part 24 is formed by resin molding and includes an outer shell portion 24a whose surface forms a design surface and an accommodating wall portion 24b that is erected at a back side (front side: right side in FIG. 3 and FIG. 4) of the outer shell portion 24a so as to have a substantially rectangular loop shape. A bag accommodating space x for accommodating an airbag (not shown) mainly is formed between the bag holder 21 and an inner surface of the outer shell portion 24a that is surrounded by the accommodating wall portion 24b. A thin-walled portion 24c is formed at a site of the outer shell portion 24a that forms the bag accommodating space x. The thin-walled portion 24c is urged and broken when the airbag is deployed and inflated.

At a front end portion of the accommodating wall portion 24b, a plurality of locking claws 24d is formed integrally therewith and respectively has a rectangular-plate shape. Each locking claw 24d has a predetermined length and a wide width. A locking protrusion 24e is formed at the front end portion of each locking claw 24d and protrudes outward (to a side away from the bag accommodating space x).

Switch support portions 24f for supporting the horn switch mechanisms 30 are respectively formed at multiple sites of the pad part 24. Each switch support portion 24f is formed integrally with the accommodating wall portion 24b so as to extend to the back side (front side) from the outer shell portion 24a of the pad part 24.

The bag holder 21 is formed into a substantially rectangular shape by pressing a conductive metal plate. Alternatively, the bag holder 21 may be formed by a means other than the pressing, for example, a die-casting molding or the like. A peripheral edge portion of the bag holder 21 is configured as a peripheral edge fixing portion 21a of a substantially rectangular loop shape for fixing the pad part 24.

Claw locking holes 21b are respectively formed at sites (front sites) of the peripheral edge fixing portion 21a that correspond to each locking claw 24 of the pad part 24. Each claw locking hole 21b has a slit shape that is long in a side direction of the bag holder 21 so as to correspond to each of the wide locking claws 24d. A front end portion of each locking claw 24b is inserted through and locked to each claw locking hole 21b.

An inner portion of the peripheral edge fixing portion 21a configures a substantially square-shaped pedestal portion 21c. A circular opening 21d is formed at a center of the pedestal portion 21c. Screw insertion holes 21e are respectively formed at multiple sites of the pedestal portion 21c near a peripheral edge portion of the opening 21d. A portion of the inflator 23 is inserted through and mounted to the opening 21d of the pedestal portion 21c.

More specifically, the inflator 23 includes a low columnar main body 23a and a flange portion 23b is formed at an outer peripheral surface of the main body 23a. In the flange portion 23b, a plurality of mounting pieces 23c is provided at equal angular intervals in a circumferential direction of the main body 23a and extends radially outward of the main body 23a. Screw insertion holes 23d are respectively formed at sites of each mounting piece 23c which are located at the front of the screw insertion hole 21e of the bag holder 21. A portion of the inflator 23 located on the rear side of the flange portion 23b is configured as a gas ejection portion 23e for ejecting the inflation gas. Further, the gas ejection portion 23e of the inflator 23 is inserted through the opening 21d of the bag holder 21 from the front side so as to protrude into the bag accommodating space x side. In addition, the flange portion 23b comes into contact with a peripheral edge portion of the opening 21d. In this state, the inflator 23 is mounted to the bag holder 21 together with a ring retainer 25.

More specifically, the ring retainer 25 is provided with a circular opening 25a equivalent to the opening 21d of the bag holder 21 through which the gas ejection portion 23e of the inflator 23 is inserted. Further, the ring retainer 25 includes a plurality of mounting screws 25b at multiple sites corresponding to respective screw insertion holes 21e of the bag holder 21. An opening of an airbag (not shown) folded in a deployable and inflatable state is disposed between the ring retainer 25 and the bag holder 21. The plurality of mounting screws 25b of the ring retainer 25 are inserted, from the rear side, through the screw insertion holes (not shown) provided on a peripheral edge portion of the opening of the airbag and the screw insertion holes 21e, 23d of each of the bag holder 21 and the inflator 23. Further, nuts 26 are screwed, from the front side, to respective mounting screws 25b after insertion, so that the airbag is fixed to the bag holder 21 via the ring retainer 25 and the inflator 23 is fixed to the bag holder 21.

Mounting portions 21f for mounting the horn switch mechanisms 30 are formed at multiple sites of the peripheral edge fixing portion 21a of the bag holder 21 so as to protrude radially outward of the circular opening 21d, respectively. Each mounting portion 21f is located at a site on the front of the switch support portion 24f of the above-described pad part 24 and is perpendicular to a longitudinal direction (front-rear direction). As shown in FIG. 3, FIG. 4 and FIGS. 7A and 7B, a circular mounting hole 21g for the mounting of the horn switch mechanism 30 is respectively formed in each mounting portion 21f so as to penetrate therethrough. At a peripheral portion of each mounting hole 21a of the bag holder 21, a plurality of clamping portions 21 is formed integrally therewith and respectively extends rearward. In the first embodiment, each clamping portion 21i is formed by bending rearwardly the sites of the bag holder 21 that are opposed to each other across each mounting hole 21g. With the formation of each clamping portion 21i by the bending, a hole 21j is formed on the outside of each clamping portion 21i in the bag holder 21, i.e., on the opposite side of the mounting hole 21g across each clamping portion 21i.

<Horn Switch Mechanism 30>

As described above, the horn switch mechanism 30 is intended for actuating the horn device 40 and the first embodiment employs a plurality of horn switch mechanisms 30. Preferably, distances from each horn switch mechanism 30 to a center (boss portion 12a) of the steering wheel 10 are set to be substantially equal to each other. This is to achieve a conductive state by reliably bringing a contact terminal 34 (to be described later) and a collar portion 31a of the snap pin 31 into contact with each other.

As shown in FIGS. 5A and 5B, each horn switch mechanism 30 includes the snap pin 31 as a support member, a pin holder 32, a contact holder 33, the contact terminal 34 as a movable-side contact part, a piece 35 and a coil spring 36 as a biasing member. Next, each part of the horn switch mechanism 30 will be described.

The snap pin 31 is a member that is supported by the cored bar 12 in the front of the bag holder 21 and formed of a conductive metal material. A supporting structure of the snap pin 31 to the cored bar 12 will be described later. A substantial portion of the snap pin 31 has an elongated shape extending in a longitudinal direction (front-rear direction) and a recess is provided at an outer peripheral surface of a front end portion thereof. In the first embodiment, as the recess, an annular locking groove 31b is formed over the entire periphery of the snap pin 31. Most part other than the rear end of the snap pin 31 is formed to have a diameter slightly smaller than that of the mounting hole 21g of the bag holder 21. As shown in FIG. 7A, the disc-shaped collar portion 31a is formed at the rear end portion of the snap pin 31 and serves as a fixed-side contact part. The collar portion 31a has an outer diameter D1 greater than an inner diameter D2 of the mounting hole 21g. In FIG. 6B, the snap pin 31 is shown in a state of being partially omitted.

As shown in FIGS. 5A and 5B and FIGS. 6A and 6B, the pin holder 32 is formed of materials having properties as an insulator, for example, a resin material. The pin holder 32 has a cylindrical shape with a stepped shape and is disposed between the snap pin 31 and the elastic member 41. The pin holder 32 is used as a slider that is slid in a longitudinal direction (front-rear direction) relative to the snap pin 31, upon actuation of the horn switch mechanism 30. At a rear end of a site (hereinafter, referred to as "a cylindrical portion 32a") of the pin holder 32 through which the snap pin 31 is inserted, an enlarged diameter portion 32b having a diameter greater than that of the cylindrical portion 32a is formed. The collar portion 31a of the snap pin 31 is fitted into the enlarged diameter portion 32b.

The contact holder 33 is formed of a resin material and has a bottomed cylindrical shape with a front surface being opened. The contact holder 33 is assembled to cover the snap pin 31 and the pin holder 32 from the rear. The contact holder 33 includes a substantially circular top plate 33a and a substantially cylindrical side wall 33b extending forward from an outer peripheral edge of the top plate 33a. At the sites of the side wall 33b that are opposed to each other in the radial direction, hook portions 33c are formed to be elastically deformable in the radial direction.

A groove 33d is formed at the rear portion of the top plate 33a and intended for aligning the orientation of the contact holder 33 when assembling the contract holder 33 to the snap pin 31 and the pin holder 32.

Claw engaging holes 33f are formed at multiple sites of the side wall 33b which are located in an intermediate portion of a longitudinal direction (front-rear direction) and spaced apart from each other in a circumferential direction. Further, notches 33g are formed at multiple sites of the side wall 33b that are located in the front end portion and spaced apart from each other in a circumferential direction.

The contact terminal 34 is formed by pressing a conductive metal plate. The contact terminal 34 includes an elongated main body 34a extending in the radial direction of the contact holder 33 and a pair of side portions 34b extending forward from both ends of the main body 34a. The main body 34a is in contact with a front surface of the top plate 33a of the contact holder 33 and each of the side portions 34b is in contact with an inner wall surface of the side wall 33b of the contact holder 33. The main body 34a is formed with a plurality of contact protrusions 34c protruding forwardly. The contact protrusions 34c are formed at equal intervals along a longitudinal direction (front-rear direction) of the main body 34a.

Meanwhile, the enlarged diameter portion 32b of the pin holder 32 is interposed between each side portion 34b and the collar portion 31a of the snap pin 31 and therefore an insulating state between each side portion 34b and the collar portion 31a is secured (see FIG. 6A). Further, the cylindrical portion 32a of the pin holder 32, the elastic member 41 and the damper holder 42 are interposed between each side portion 34b and the snap pin 31 (a portion of the snap pin 31 other than the collar portion 31a), so that an insulating state between each side portion 34b and the snap pin 31 is secured.

Whole piece 35 is integrally formed of a resin material that is an insulating material. A portion of the piece 35 is configured by an annular portion 35b having a circular ring shape. The annular portion 35b is provided with an insertion hole 35a having a diameter slightly greater than that of the portion of the snap pin 31 other than the collar portion 31a. An outer diameter of the annular portion 35b is set to the same extent as an outer diameter of the coil spring 36 and an outer diameter of a rear end portion of an inner wall surface of the through-hole 12c, i.e., a maximum diameter of the tapered inner wall surface (see FIG. 9).

Locking pieces 35c extend forwardly from multiple sites that are located at the front surface of the annular portion 35b and around the insertion hole 35a. At a front end of each locking piece 35c, a claw portion 35d is projected radially inward. These claw portions 35d enter into the engaging groove 31b of the snap pin 31. An outer surface of each locking piece 35c configures a portion of a cylindrical surface that has the same diameter at any site in a longitudinal direction (front-rear direction). In other words, the outer surface of each locking piece 35c does not correspond to a tapered inner wall surface of the through-hole 12c. Therefore, the outer surface of each locking piece 35c does not come into surface contact with the inner wall surface.

Further, a plurality of engaging pieces 35e extends forwardly from the sites between adjacent locking pieces 35c, which are located at the front surface of the annular portion 35b and around the insertion hole 35a. An outer surface of each engaging piece 35e configures a portion of a tapered surface whose diameter is increased toward the rear side.

A pair of mounting portions 35f extends rearward from the annular portion 35b. Each mounting portion 35f is curved to bulge radially outward of the piece 35 in accordance with an outer shape of the snap pin 31.

As shown in FIG. 9, the piece 35 is non-detachably mounted to the snap pin 31 in such a way that the annular portion 35b and both mounting portions 35f are fitted to the outside of the snap pin 31 and each claw portion 35d enters into the locking groove 31b. As described above, the piece 35 is configured in such a way that an outer surface of a plurality of engaging pieces 35e intermittently (non-continuously) surrounds an axis passing through a center of the annular portion 35b across an outer surface of a plurality of locking pieces 35c. With this configuration, as a whole, the piece 35 has a shape similar to a shape having a tapered outer surface whose diameter is increased toward the rear side.

The coil spring 36 is wound around the site of the snap pin 31 other than the collar portion 31a. The coil spring 36 is disposed in a compressed state between the annular portion 35b of the piece 35 and a stepped portion 32c formed in the cylindrical portion 32a of the pin holder 32. In this state, the annular portion 35b receives a forward biasing force of the compressed coil spring 36.

In this way, the horn switch mechanism 30 is configured as an assembly by unifying multiple single parts, i.e., the snap pin 31, the pin holder 32, the contact holder 33, the contact terminal 34, the coil spring 36 and the piece 35t. Therefore, the unified horn switch mechanism 30 can be handled as one assembly when mounting or replacing the horn switch mechanism 30.

<Elastic Member 41>

Figure 8:
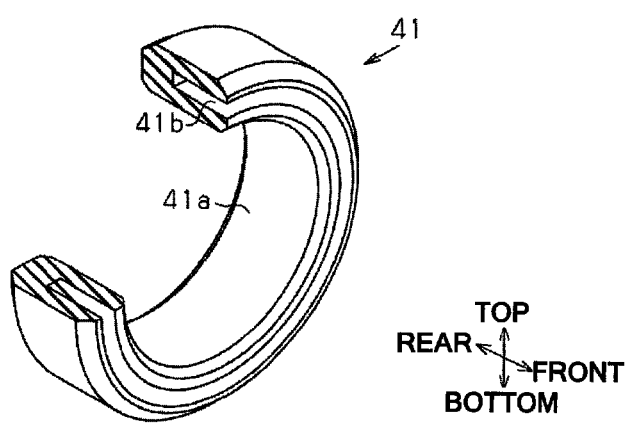
FIG. 8 is a partial perspective view showing an elastic member of the first embodiment, a portion of which is cut out.

As shown in FIG. 8 and FIG. 9, the elastic member 41 is interposed between the pin holder 32 of the horn switch mechanism 30 and the bag holder 21. The entire elastic member 41 is formed of an elastic material such as rubber (for example, EPDM, silicon rubber, etc.), elastomer, etc. The elastic member 41 is provided with an insertion hole 41a having a diameter slightly greater than that of the cylindrical portion 32a of the pin holder 32 and has a substantially annular shape. In addition, the elastic member 41 includes an annular groove 41b that is opened at a front surface of the elastic member and formed concentrically with the insertion hole 41a. The groove 41b has a rectangular cross-section. Further, as shown in FIG. 7B, the elastic member 41 is sandwiched by the mounting portion 21f of the bag holder 21 and the enlarged diameter portion 32b of the pin holder 32 from the front and rear. Further, the elastic member 41 is sandwiched by the clamping portion 21i of the bag holder 21 and the cylindrical portion 32a of the pin holder 32 from the outside and inside of the radial direction.

The elastic member 41 configures a dynamic damper together with the above-described airbag device 20. In the first embodiment, the elastic member 41 serves as a spring of the dynamic damper and the airbag device 20 serves as a damper mass.

In this case, the resonance frequency in a vertical direction or lateral direction of the dynamic damper is set to an aimed damping frequency (desired damping frequency) for the vibration in a vertical direction or lateral direction of the steering wheel 10 by tuning the size, thickness in the radial direction, length in a longitudinal direction (front-rear direction) or the like of the elastic member 41.

<Damper Holder 42>

As shown in FIGS. 5A and 5B and FIGS. 6A and 6B, the damper holder 42 is locked to the horn switch mechanism 30 before the mounting of the horn switch mechanism 30 to the bag holder 21 and holds the elastic member 41 in a state of being mounted on the outside of the cylindrical portion 32a of the pin holder 32. Further, the damper holder 42 is located between the elastic member 41 and the bag holder 21 in a state where the horn switch mechanism 30 is mounted to the bag holder 21.

Main portion of the damper holder 42 is configured by a side wall 42a and a front wall 42b, both of which are formed of a resin material. The side wall 42a has a substantially cylindrical shape whose diameter is slightly greater than that of the elastic member 41 and smaller than that of the side wall 33b of the contact holder 33. The side wall 42a is disposed on the outside in the radial direction of the elastic member 41 and on the inside in the radial direction of the clamping portion 21i of the bag holder 21. The front wall 42b is provided with a mounting hole 42c having a diameter slightly greater than that of the cylindrical portion 32a of the pin holder 32 and has a substantially annular shape. The front wall 42b is disposed on the front side of the elastic member 41 and on the rear side of the mounting portion 21f of the bag holder 21.

Engaging claws 42d (see FIG. 5B) are formed at multiple sites of the side wall 42a that are spaced apart from each other in a circumferential direction. These engaging claws 42 are engaged with the claw engaging holes 33f of the contact holder 33 from the inside and therefore the damper holder 42 is locked to the contact holder 33.

Stoppers 42e (see FIGS. 5A and 5B) are formed at multiple sites that are located in the front end portion of the side wall 42a and spaced apart from each other in a circumferential direction. These stoppers 42e are engaged with the notches 33g of the contact holder 33 and therefore positioning in a longitudinal direction (front-rear direction) of the damper holder 42 to the contact holder 33 is made.

The vibration control structure for the steering wheel according to the first embodiment is configured as described above. Next, an operation of the first embodiment will be described mainly by referring to an operation of the vibration control structure.

First, an operation for mounting each horn switch mechanism 30 to the bag holder 21 via the elastic member 41 and the damper holder 42 will be described. As this operation, an operation for mounting the elastic member 41 and the damper holder 42 to each horn switch mechanism 30 and an operation for mounting each horn switch mechanism 30 into each mounting hole 21g are performed.

As shown in FIG. 5B and FIG. 6A, upon performing the former operation, the cylindrical portion 32a of the pin holder 32 of each horn switch mechanism 30 is inserted through the insertion hole 41a of the elastic member 41. This insertion is performed up to a position where the enlarged diameter portion 32b of the pin holder 32 comes into contact with the elastic member 41 from the rear. With this insertion, the elastic member 41 is mounted to the outside of the cylindrical portion 32a of the pin holder 32.

Then, the side wall 42a of the damper holder 42 is inserted between an outer peripheral surface of the elastic member 41 and the side wall 33b of the contact holder 33 and between the outer peripheral surface of the elastic member 41 and the side portion 34b of the contact terminal 34. In the process of this insertion, when the front wall 42b of the damper holder 42 approaches the elastic member 41, the engaging claws 42d shown in FIG. 5B are engaged with the claw engaging holes 33f of the contact holder 33 and therefore the damper holder 42 is locked to the contact holder 33 (see FIG. 5A). The elastic member 41 is in a state of being surrounded by the damper holder 42 and the pin holder 32. The side wall 42a of the damper holder 42 locked to the contact holder 33 is located in the outside of the radial direction of the elastic member 41 and the front wall 42b of the damper holder 42 is located in the front side of the elastic member 41. The elastic member 41 is held in a state of being mounted to the outside of the cylindrical portion 32a of the pin holder 32. Therefore, the detachment of the elastic member 41 from the pin holder 32 is less likely to occur.

Further, almost simultaneously with the engagement of the engaging claws 42d, each stopper 42e of the damper holder 42 is engaged with the corresponding notch 33g of the contact holder 33. With this engagement, the further insertion of the damper holder 42 into the contact holder 33 is restricted and positioning in a longitudinal direction (front-rear direction) of the damper holder 42 to the contact holder 33 is made. In this state, a gap is formed between the side wall 42a and the side portion 34b and allows the insertion of the clamping portion 21i.

Upon performing the latter operation, of the horn switch mechanism 30 having the elastic member 41 and the damper holder 42 mounted thereto as described above, the snap pin 31 (support member), the piece 35, the coil spring 36 (biasing member) and the cylindrical portion 32a of the pin holder 32 are inserted, from the rear, into the mounting hole 21g of the bag holder 21 indicated by a two-dot chain line in FIG. 6A. In the process of this insertion, as shown in FIGS. 7A and 7B, both clamping portions 21i of the bag holder 21 enter into a gap between the side wall 42a of the damper holder 42 and the side portion 34b of the contact terminal 34. Further, the hook portions 33c of the contact holder 33 are inserted into the hole 21j of the bag holder 21. With these hook portions 33c, the side portion 34b of the contact terminal 34 comes into contact with an outer surface of the clamping portion 21i of the bag holder 21. With this contact, the bag holder 21 and the contact terminal 34 are in a conductive state.

The insertion of the horn switch mechanism 30 is performed up to a position where the front wall 42b of the damper holder 42 comes into contact with the mounting portion 21f of the bag holder 21. In this position, a front end portion of the side portion 34b urged by the hook portion 33c of the contact holder 33 is locked to a front side of the clamping portion 21i of the bag holder 21. Accordingly, the contact holder 33, in turn, the horn switch mechanism 30 is prevented from moving rearward from the bag holder 21.

In this way, the elastic member 41 is sandwiched by the mounting portion 21f of the bag holder 21 and the enlarged diameter portion 32b of the pin holder 32 from the front and rear. Further, the elastic member 41 is sandwiched by the clamping portion 21i of the bag holder 21 and the cylindrical portion 32a of the pin holder 32 from the outside and inside of the radial direction.

In this embodiment, the elastic member is pushed by the bag holder 21 from the front side of the elastic member and the outside of the radial direction of the elastic member and is pushed by the pin holder 32 from the rear side of the elastic member and the inside of the radial direction of the elastic member. However, the pushing direction may by changed in accordance with the structure of the bag holder 33 and the horn switch mechanism 30.

In a state where each horn switch mechanism 30 is mounted to the bag holder 21 as described above, the movement of the elastic member 41 in a direction (longitudinal direction) along the axis L1 of the steering shaft 14 is restricted by the mounting portion 21f and the enlarged diameter portion 32b. Further, the movement of the elastic member 41 in a direction perpendicular to the axis L1 of the steering shaft 14 is restricted by the clamping portion 21i and the cylindrical portion 32a.

In a state where each horn switch mechanism 30 is mounted as described above, the collar portion 31a of the snap pin 31 is located on the rear side of the mounting hole 21g of the bag holder 21. This collar portion 31a receives a rearward biasing force from the coil spring 36.

Further, in the mounted state, the pin holder 32 is disposed between the snap pin 31 and the bag holder 21. Accordingly, the pin holder 32 supports the bag holder 21 so as to be movable in a longitudinal direction (front-rear direction) relative to the snap pin 31 and also transmits a rearward biasing force of the coil spring 36 to the collar portion 31a of the snap pin 31 while preventing contact between the snap pin 31 and the bag holder 21, i.e., holding an insulating state therebetween.

Further, in the mounted state, the top plate 33a of the contact holder 33 comes into contact with the switch support portion 24f of the above-described pad part 24 (see FIG. 3).

Therefore, for example, when the air device 20 is smashed, a reaction force thereof is supported by the switch support portion 24f and therefore the contact holder 33 is prevented from being detached from the pin holder 32.

Furthermore, in the mounted state, the coil spring 36 of each horn switch mechanism 30 and the snap pin 31 inserted through the coil spring 36 are protruded forward (in a direction separated from the pad part 24) from the bag holder 21.

Next, an operation for assembling the airbag device 20 to the cored bar 12 via the plurality of horn switch mechanisms 30 will be described.

Upon performing the operation, as shown in FIG. 9, the snap pin 31 of each horn switch mechanism 30 approaches the through-hole 12c of the corresponding holding portion 12b of the cored bar 12 from the rear. At this time, the front portion (hereinafter, referred to as "a front end 31c") of the snap pin 31 that is located in the front of the locking groove 31b is projected slightly forward from each coil spring 36 and each piece 35 (see FIG. 5A). Since each piece 35 is mounted to the snap pin 31 in a step before the snap pin 31 is inserted through the through-hole 12c, the piece 35 is also inserted into the through-hole 12c in the process of inserting the snap pin 31 through the through-hole 12c.

As a result of the insertion, the annular portion 35b of the piece 35 approaches the holding portion 12b and the engaging piece 35e approaches an inner wall surface of the through-hole 12c. Further, the front end 31c of the snap pin 31 comes into contact with the clip 13. Furthermore, as the snap pin 31 or the like is moved forward against a biasing force of the clip 13, the clip 13 is elastically deformed radially outward of the snap pin 31. Then, when the snap pin 31 is moved up to a position where the locking groove 31b is opposed to the clip 13, the clip tries to enter into the locking groove 31b by own elastic restoring force.

Meanwhile, the claw portion 35d of the piece 35 biased forward by the coil spring 36 enters into the locking groove 31b. Therefore, the clip 13 enters between the claw portion 35d and a front wall surface 31d in the locking groove 31b while compressing the coil spring 36 rearward in the process of entering into the locking groove 31b. As the clip 13 enters therebetween in this way, the claw portion 35d is located on the rear side of the clip 13 in the locking groove 31b. The portion of the clip 13 located in the front of the through-hole 12c is sandwiched by the claw portion 35d biased forward by the coil spring 36 and the front wall surface 31d of the locking groove 31b from the front and rear whereby the movement of the clip is restricted. Meanwhile, the movement of the snap pin 31 in a longitudinal direction (front-rear direction) is restricted by the clip 13 that enters into the locking groove 31b. Since the snap pin 31 is locked to the cored bar 12 by the clip 13 in this way, fastening of each horn switch mechanism 30 to the cored bar 12 and mounting of the airbag device 20 to the cored bar 12 are performed. A structure for locking the snap pin 31 to the cored bar 12 by the elasticity of the clip 13 due to the insertion of the snap pin 31 is also referred to "a snap-fit structure".

In this assembled state, an outer surface of each engaging piece 35e comes into contact with an inner wall surface of the through-hole 12c. Further, the claw portion 35d is spaced slightly forward from a rear wall surface 31e in the engaging groove 31b. In this way, the piece 35 is interposed between the inner wall surface of the through-hole 12c in the holding portion 12b of the cored bar 12 and the snap pin 31.

Further, in the assembled state, the snap pin 31 of each horn switch mechanism 30 locked to the cored bar 12 supports the bag holder 21 of the airbag device 20 via the pin holder 32 so as to be movable forward and rearward relative to the cored bar 12. In other words, the snap pin 31 supports the bag holder 21 so as to be movable close to or away from the cored bar 12.

Here, the coil spring 36 interposed between the stepped portion 32c of the pin holder 32 and the annular portion 35b of the piece 35 is in a state of being more compressed than a state before being mounted to the cored bar 12. The coil spring 36 in the compressed state urges the pin holder 32 rearward (in a direction away from the cored bar 12) and therefore the contact protrusions 34c of the contact terminal 34 are spaced rearward from the collar portion 31a of the snap pin 31.

Figure 10:
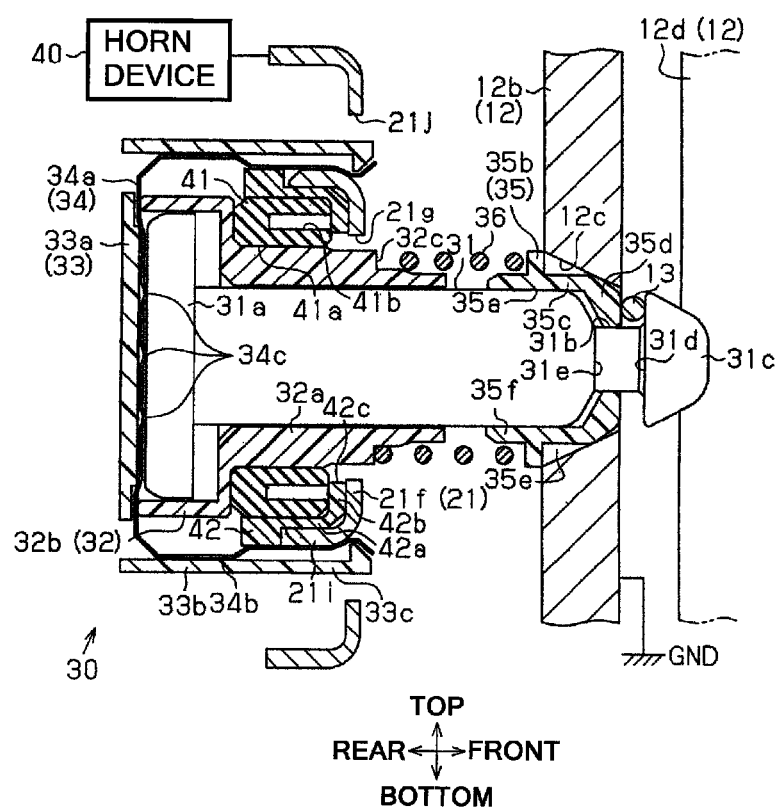
FIG. 10 is a partial sectional view showing an internal structure of the horn switch mechanism or the like when the airbag device is pressed, etc., from the state of FIG. 9.

By being further compressed, the coil spring 36 allows the airbag device 20 to move toward the cored bar 12. In other words, the coil spring 36 is compressed in a state of securing a horn stroke. Here, the horn stroke refers to a movement amount of the airbag device 20 toward the cored bar 12, which is required for shifting from a state (off-state of the horn switch mechanism 30: FIG. 9) where the contact protrusions 34c of the contact terminal 34 are spaced apart from the collar portion 31a of the snap pin 31 to a state (on-state of the horn switch mechanism 30: FIG. 10) where the contact protrusions 34c are in contact with the collar portion 31a. Further, a horn load is determined which refers to an applying load when a driver turns on each horn switch mechanism 30 by pressing the airbag device 20 by such a coil spring 36.

However, in the steering wheel 10, during a normal state where the airbag device 20 is not pressed forward or an excessive load is not applied to the airbag device 20, the contact protrusions 34c of the contact terminal 34 is spaced rearward from the collar portion 31a of the snap pin 31 that is a fixed-side contact part, as shown in FIG. 9. The contact terminal 34 and the snap pin 31 are in a non-conductive state and the horn device 40 is not actuated. At this time, a rearward biasing force of the coil spring 36 is applied, via the pin holder 32, to the collar portion 31a of the snap pin 31 that is locked to the cored bar 12 by the clip 13.

Further, at this time, a forward biasing force of the coil spring 36 is applied to the piece 35 through the annular portion 35b and the claw portion 35d of the piece 35 that enters into the locking groove 31b of the snap pin 31 presses forward the clip 13 in the locking groove 31b. With this pressing, the clip 13 is sandwiched by the front wall surface 31d in the locking groove 31b and the claw portion 35d from the front and rear whereby the movement of the clip is restricted.

On the other hand, when the airbag device 20 is pressed forward or an excessive load is applied to the airbag device 20 and therefore the bag holder 21 is moved forward against the coil spring 36, the pin holder 32 of at least one horn switch mechanism 30 is pressed against a biasing force of the coil spring 36 via the bag holder 21 and moved to the cored bar 12 side (front side). The contact holder 33 and the contact terminal 34 are also moved to the cored bar 12 side (front side) together with the bag holder 21 and the pin holder 32. As a situation where an excessive load is applied, for example, it is assumed that a vehicle travels in a rough road and therefore the airbag device 20 is greatly vibrated.

Then, as shown in FIG. 10, when at least one of the plural contact protrusions 34c of the contact terminal 34 comes into contact with the collar portion 31a of the snap pin 31, the bag holder 21 and the cored bar 12 connected to a ground GND (vehicle body earth) are conducted through the clip 13, the snap pin 31 and the contact terminal 34. With this conduction, the horn switch mechanism 30 is closed and the horn device 40 electrically connected to the bag holder 21 is actuated.

In this way, the snap pin 31 has also a function as a fixed-side contact part, in addition to the function of being locked to the holding portion 12b of the cored bar 12 and the function of supporting the bag holder 21 so as to be movable in a longitudinal direction (front-rear direction) relative to the cored bar 12.

Further, when the bag holder 21 is moved forwardly as described above, the rearward biasing force of the coil spring 36 that has been previously applied to the collar portion 31a of the snap pin 31 via the pin holder 32 and the bag holder 21 is lost. Therefore, the snap pin 31 can be swung with, as a fulcrum, a site locked to the cored bar 12 by the clip 13. In this case, the rearward biasing force that has been previously applied to the clip 13 via the front wall surface 31d in the locking groove 31b is lost and therefore the clip 13 can be moved in the locking groove 31b.

On the other hand, in the airbag device 20, during a normal state where impact from the front due to the frontal collision or the like is not applied to a vehicle, gas is not ejected from the gas ejection portion 23e of the inflator 23 and therefore the airbag is held in a stage of being folded.

During high-speed traveling of a vehicle or idling of an in-vehicle engine in the above-described normal state, vibration in a vertical direction or lateral direction is often transmitted to the steering wheel 10. This vibration is transmitted to the airbag device 20 through the cored bar 12, each horn switch mechanism 30 and each elastic member 41.

Depending on the vibration, the airbag device 20 serves as a damper mass of the dynamic damper and each elastic member 41 serves as a spring of the dynamic damper.

For example, when the steering wheel 10 is vibrated in a vertical direction at a predetermined frequency, each elastic member 41 is vibrated (resonated) together with the airbag device 20 in a vertical direction while being elastically deformed at a resonance frequency that is the same or close to the predetermined frequency, thereby absorbing the vibration energy in a vertical direction of the steering wheel 10. With this absorption, the vibration in a vertical direction of the steering wheel 10 is suppressed (controlled).

Further, when the steering wheel 10 is vibrated in a lateral direction at a predetermined frequency, each elastic member 41 is vibrated together with the airbag device 20 in a lateral direction while being elastically deformed at a resonance frequency that is the same or close to the predetermined frequency, thereby absorbing the vibration energy in a lateral direction of the steering wheel 10. With this absorption, the vibration in a lateral direction of the steering wheel 10 is suppressed (controlled).

In this way, according to the first embodiment, vibration in both vertical and lateral directions of the steering wheel 10 is suppressed (controlled).

The elastic member 41 is likely to be elastically deformed owing to the groove 41b formed in the elastic member 41. Therefore, the elastic member 41 is likely to resonate together with the airbag device 20 when the steering wheel 10 is vibrated.

Figure 11:
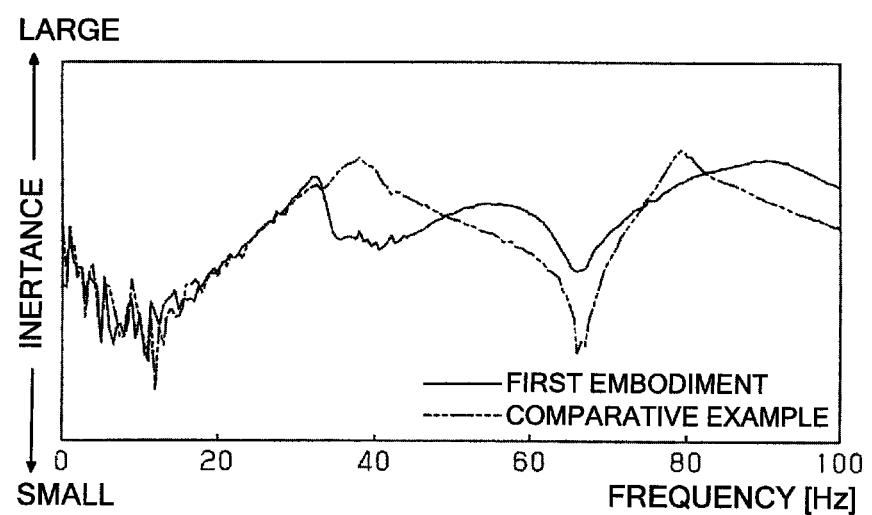
FIG. 11 shows the effect of the vibration control structure of the first embodiment and is a graph showing results of measuring the inertance (vibration level) for each frequency.

Here, FIG. 11 shows results of measuring the inertance for each frequency when the steering wheel 10 is vibrated in various frequencies. The inertance is a frequency response function according to a ratio (acceleration/excitation force) of the acceleration and excitation force. As the value of the inertance becomes larger, the vibration level is deteriorated. In FIG. 11, a solid line represents a frequency characteristic in the first embodiment where the elastic member 41 is used and a two-dot chain line represents a frequency characteristic in a case (comparative example) where the elastic member 41 is not used. From the FIG. 11, it can be seen that, in the first embodiment, the level of vibration at around 40 Hz occurring during high-speed travelling of a vehicle or idling of an in-vehicle engine is particularly enhanced.

When impact according to the frontal collision or the like is applied to a vehicle from the front, a driver tends to tilt forward due to inertia. Meanwhile, in the airbag device 20, the inflator 23 is actuated according to the impact and gas is ejected from the gas ejection portion 23e. As the gas is supplied to the airbag, the airbag is deployed and inflated. When a pressing force applied to the outer shell portion 24a of the pad part 24 is increased by the airbag, the outer shell portion 24a is broken at the thin-walled portion 24c. The airbag continues to be deployed and inflated rearward through an opening caused by the breakage. Since the deployed and inflated airbag is interposed in the front of a driver who tends to tilt forward by the impact of the frontal collision, the forward tilt of a driver is restricted and therefore a driver is protected from the impact.

When the airbag is inflated rearward, a force directed to the rear is applied to the bag holder 21. In this regard, according to the first embodiment, the snap pin 31 of each horn switch mechanism 30 is supported by the holding portion 12b of the cored bar 12. The collar portion 31a formed at the rear end portion of each snap pin 31 is located in the rear of the mounting hole 21g of the bag holder 21. The collar portion 31a has an outer diameter D1 greater than an inner diameter D2 of the mounting hole 21g (see FIG. 7A). Therefore, the collar portion 31a serves as a stopper by coming into contact with a peripheral portion of the mounting hole 21g of the bag holder 21 when the bag holder 21 is moved rearward.

According to the first embodiment described above in detail, the following effects are obtained.

(1) The elastic member 41 is sandwiched by the mounting portion 21f of the bag holder 21 and the enlarged diameter portion 32b of the pin holder 32 (slider) from the front and rear. Further, the elastic member 41 is sandwiched by the clamping portion 21i of the bag holder 21 and the cylindrical portion 32a of the pin holder 32 (slider) from the outside and inside of the radial direction (FIGS. 7A and 7B).

Therefore, it is possible to mount the elastic member 41 with high strength by performing a simple operation to sandwich the elastic member 41 by the bag holder 21 and the pin holder 32 (slider).

(2) The collar portion 31a having the outer diameter D1 greater than the inner diameter D2 of the mounting hole 21g is formed in the rear end portion of the snap pin 31 (support member) that is a site located in the rear of the mounting hole 21g of the bag holder 21 (FIG. 7A).

Therefore, although a force directed to the rear is applied to the bag holder 21 during inflation of the airbag, it is possible to restrict an excessive rearward movement of the bag holder 21, in turn, the airbag device 20 by the collar portion 31a of the snap pin 31 (support member).

(3) Each horn switch mechanisms 30 is mounted to the bag holder 21 by inserting the snap pin 31 (support member) and the pin holder 32 (slider) through the mounting hole 21g in a state where the elastic member 41 is mounted to the outside of the cylindrical portion 32a of the pin holder 32 (slider) (FIG. 7A).

In the steering wheel 10 where each horn switch mechanisms 30 is mounted to the bag holder 21 in this manner, before being mounted to the bag holder 21, the elastic member 41 is held in a state of being mounted to the outside of the cylindrical portion 32a of the pin holder 32 (slider) by locking the damper holder 42 to the horn switch mechanism 30 (FIG. 6A). Further, in a state where the horn switch mechanism 30 is mounted to the bag holder 21, the damper holder 42 is located between the elastic member 41 and the bag holder 21 (FIG. 7A).

Therefore, the detachment of the elastic member 41 from the cylindrical portion 32a of the pin holder 32 (slider) is suppressed by the damper holder 42 before or during an operation to mount each horn switch mechanism 30 to the bag holder 21. Accordingly, each horn switch mechanism 30 can be easily handled and it is possible to achieve an improved workability of the mounting operation.

Further, in a state where each horn switch mechanism 30 is mounted to the bag holder 21, the damper holder 42 is located between the elastic member 41 and the bag holder 21. Therefore, the damper holder 42 is prevented from affecting the fact that the elastic member 41 is sandwiched by the bag holder 21 and the pin holder 32 (slider) from the front and rear thereof and from the outside and inside of the radial direction.

Second Embodiment

Figure 12:
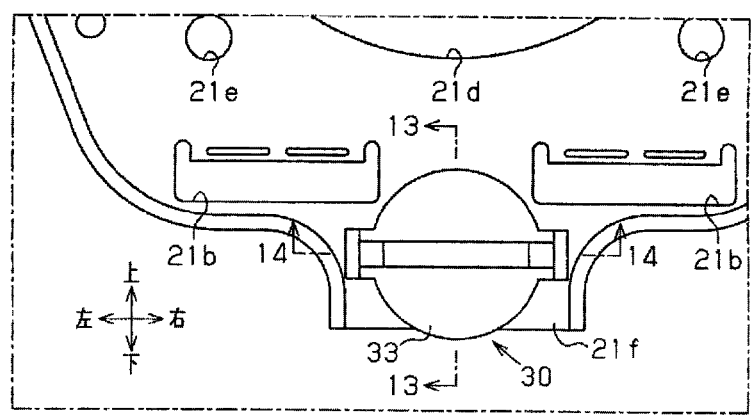
FIG. 12 shows a second embodiment of a vibration control structure for a steering wheel and is a partial front view showing a portion of a bag holder to which a horn switch mechanism is mounted.

Next, a second embodiment of a vibration control structure for a steering wheel will be described with reference to FIG. 12 to FIG. 14.

The second embodiment uses the elastic member 41 which has a form different from the first embodiment.

Figure 13:
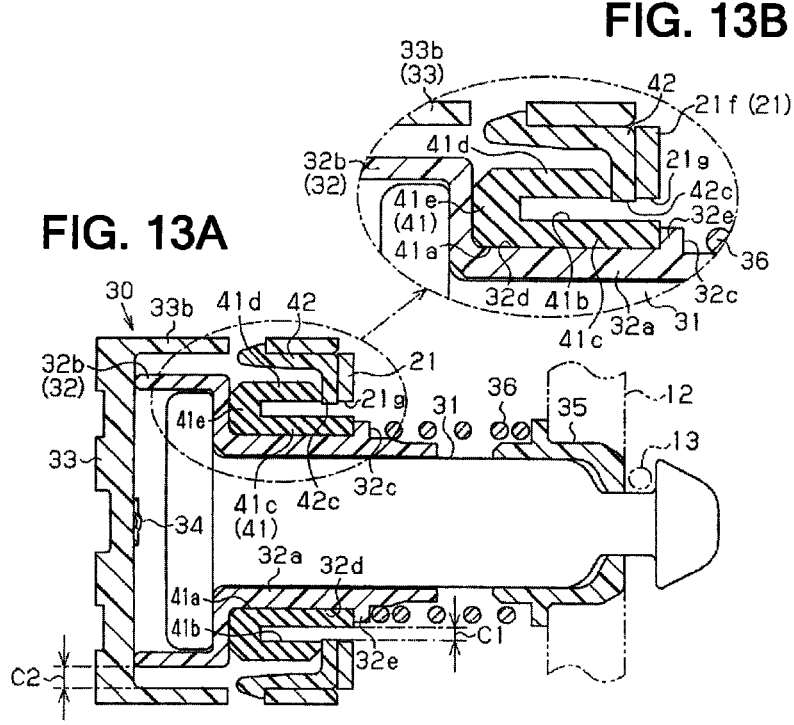
FIG. 13A is a partial sectional view showing a structure of the horn switch mechanism or the like, taken along a line 13-13 in FIG. 12
FIG. 13B is a partial enlarged sectional view of FIG. 13A.
Figure 14:
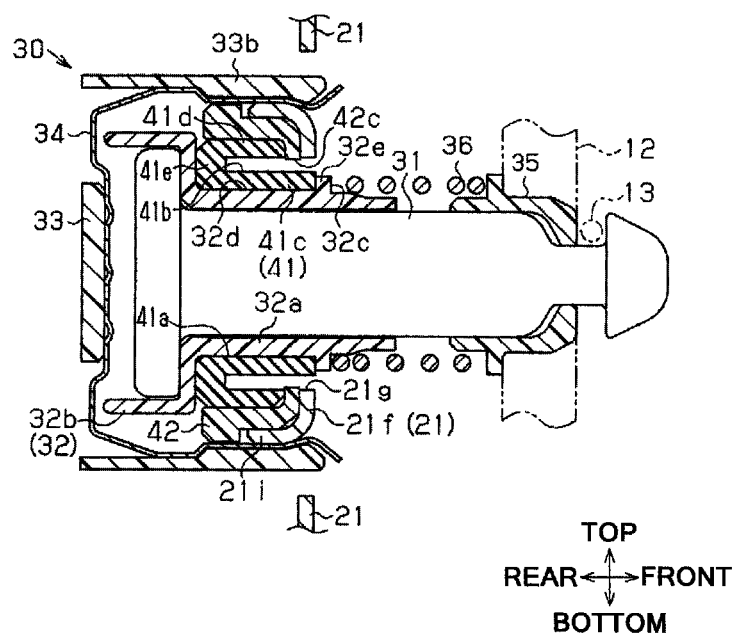
FIG. 14 is a partial sectional view showing a structure of the horn switch mechanism or the like, taken along a line 14-14 in FIG. 12.

FIG. 13A shows a sectional structure of the horn switch mechanism 30 mounted to the bag holder 21 and FIG. 14 shows a sectional structure of the horn switch mechanism 30 in a cross-section different from FIG. 13. More specifically, FIG. 13A shows a sectional structure taken along a line 13-13 in FIG. 12 and FIG. 14 shows a sectional structure taken along a line 14-14 perpendicular to the line 13-13 in FIG. 12.

As shown in FIG. 13A and FIG. 14, a recess 32d is formed over the entire periphery of the outer peripheral portion of the cylindrical portion 32a of the pin holder 32 in between the enlarged diameter portion 32b and the stepped portion 32c. The portion of the cylindrical portion 32a that is sandwiched by the stepped portion 32c and the recess 32d configures an annular protrusion 32e. The annular protrusion 32e is located in the front side of the mounting hole 21g of the bag holder 21. The annular protrusion 32e has a function of supporting the rear end portion of the coil spring 36.

As shown in FIG. 13B, the elastic member 41 includes an inner cylinder portion 41c, an outer cylinder portion 41d and a connecting portion 41e. The inner cylinder portion 41c has a cylindrical shape extending in a longitudinal direction (front-rear direction). The inner cylinder portion 41c is provided with the insertion hole 41a and mounted to the outside of the recess 32d. The outer cylinder portion 41d has an inner diameter greater than that of the inner cylinder portion 41c and is formed into a cylindrical shape extending in a longitudinal direction (front-rear direction). The outer cylinder portion 41d is disposed concentrically with the inner cylinder portion 41c and surrounds the inner cylinder portion 41c. The connecting portion 41e has an annular shape and connects a rear end portion of the inner cylinder portion 41c and a rear end portion of the outer cylinder portion 41d to each other. A space located at the front side of the connecting portion 41e in between the inner cylinder portion 41c and the outer cylinder portion 41d configures the groove 41b.

As shown in FIG. 14, the elastic member 41 is sandwiched by the clamping portion 21i of the bag holder 21 and the recess 32d of the cylindrical portion 32a from the outside and inside of the radial direction. Further, the elastic member 41 is sandwiched by the mounting portion 21f of the bag holder 21 and the enlarged diameter portion 32b from the front and rear. In this regard, the second embodiment is common to the first embodiment.

In the second embodiment, a front end portion of the inner cylinder portion 41c of the elastic member 41 extends up to the front than in the first embodiment and enters into the mounting hole 21g. A front end surface of the inner cylinder portion 41c is located near a front surface of the mounting portion 21f and is in contact with or close to the annular protrusion 32e. With this configuration, the front end portion of the inner cylinder portion 41c is located radially inward of the mounting hole 21g. Further, the inner cylinder portion 41c of the elastic member 41 is located radially inward of the mounting hole 42c of the damper holder 42.

Here, as shown in FIG. 13A, smaller one of an interval between an inner wall surface of the mounting hole 42c and the inner cylinder portion 41c and an interval between an inner wall surface of the mounting hole 21g and the inner cylinder portion 41c is defined as an interval C1. Further, an interval between the side wall 33b of the contact holder 33 and the enlarged diameter portion 32b of the pin holder 32 is defined as an interval C2. In the second embodiment, both intervals C1 and C2 are set so that a relationship of C1<C2 is established.

Other configurations are the same as in the first embodiment. Accordingly, the same or similar element will be denoted by the same reference numeral as that of the first embodiment and the duplicated explanation thereof will be omitted.

In the vibration control structure of the second embodiment configured as described above, all of the damper holder 42, the pin holder 32 and the contact holder 33 are rigid by being formed of resin. Further, the bag holder 21 is rigid by being formed of metal. Accordingly, in a case where the elastic member 41 is greatly vibrated together with the airbag device 20 while being elastically deformed due to the vibration of the steering wheel 10 and an inner wall surface of the mounting hole 42c of the damper holder 42 or an inner wall surface of the mounting hole 21g of the bag holder 21 comes into contact with the cylindrical portion 32a of the pin holder 32, there is a possibility that noise (knocking sound) is generated. This situation may occur when a vehicle travels in a rough road, for example. Further, even when the enlarged diameter portion 32b of the pin holder 32 comes into contact with the side wall 33b of the contact holder 33, there is also a possibility that noise is generated.

In this regard, according to the second embodiment where the front end portion of the inner cylinder portion 41c of the elastic member 41 enters into the mounting hole 21g, an inner wall surface of the mounting hole 42c of the damper holder 42 is supported by the inner cylinder portion 41c when the inner wall surface is close to the cylindrical portion 32a as described above. The inner wall surface of the mounting hole 42c is prevented from coming into contact with the cylindrical portion 32a by the inner cylinder portion 41c. Similarly, an inner wall surface of the mounting hole 21g of the bag holder 21 is supported by the front end portion of the inner cylinder portion 41c when the inner wall surface is close to the cylindrical portion 32a. The inner wall surface of the mounting hole 21g is prevented from coming into contact with the cylindrical portion 32a by the front end portion of the inner cylinder portion 41c.

Therefore, even when sound is generated by the contact of the inner wall surface of the mounting holes 42c, 21g with the inner cylinder portion 41c, the sound is smaller than the sound that is generated by the contact of the inner wall surface with the cylindrical portion 32a, i.e., by the contact between rigid parts. The reason is that the inner cylinder portion 41c is elastically deformed by being brought into contact with the inner wall surface and therefore the generation of sound is suppressed.

Further, as shown in FIG. 13A, since the interval C2 is greater than the interval C1, the inner wall surface of the mounting holes 42c, 21g is supported by the inner cylinder portion 41c as described above and therefore the enlarged diameter portion 32b of the pin holder 32 is prevented from coming into contact with the side wall 33b of the contact holder 33.

As a result, according to the second embodiment, the following effects are obtained, in addition to the above effects (1) to (3).

(4) The inner cylinder portion 41c of the elastic member 41 extends forwardly and enters into the mounting hole 21g of the bag holder 21 (FIG. 13A).

Therefore, in a case where a large vibration is transmitted to the steering wheel 10, rigid parts (the bag holder 21 and the pin holder 32, the damper holder 42 and the pin holder 32) are prevented from coming into contact with each other and therefore it is possible to suppress occurrence of uncomfortable noise due to the contact.

(5) Both intervals C1 and C2 are set so that the interval C2 is greater than the interval C1 (FIG. 13A).

Therefore, in a case where a large vibration is transmitted to the steering wheel 10, the enlarged diameter portion 32b of the rigid pin holder 32 is prevented from coming into contact with the side wall 33b of the rigid contact holder 33 and therefore it is possible to suppress occurrence of noise due to the contact.

Further, it is sufficient to set both intervals C1 and C2 so as to satisfy the above-described condition and it is not necessary to add a part for suppressing the contact or to provide a structure therefor.

Third Embodiment

Figure 15:
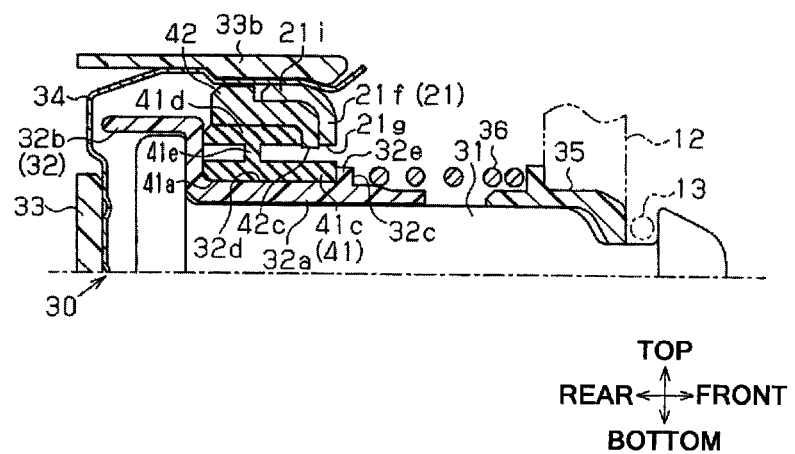
FIG. 15 shows a third embodiment of a vibration control structure for a steering wheel and is a partial sectional view showing a portion of a horn switch mechanism that is mounted to a bag holder.

Next, a third embodiment of a vibration control structure for a steering wheel will be described with reference to FIG. 15.

The third embodiment is the same as the second embodiment in the respects that the elastic member 41 is configured by the inner cylinder portion 41c, the outer cylinder portion 41d and the connecting portion 41e. The third embodiment is different from the second embodiment in the respects that the connecting portion 41e is not disposed at end portions in a longitudinal direction (front-rear direction) of the inner cylinder portion 41c and the outer cylinder portion 41d but disposed at intermediate portions thereof. The intermediate portion in a longitudinal direction (front-rear direction) of the inner cylinder portion 41c and the intermediate portion in a longitudinal direction (front-rear direction) of the outer cylinder portion 41d are connected by the connecting portion 41e. The connecting portion 41e is perpendicular to the longitudinal direction (front-rear direction).

Other configurations are the same as in the second embodiment. Accordingly, the same or similar element will be denoted by the same reference numeral as that of the second embodiment and the duplicated explanation thereof will be omitted.

In the vibration control structure of the third embodiment configured as described above, the elastic member 41 is vibrated together with the airbag device 20 while being elastically deformed due to the vibration of the steering wheel 10. At this time, in the elastic member 41, the movement of the bag holder 21 and the damper holder 42 is transmitted to the connecting portion 41e via the outer cylinder portion 41d or the movement of the pin holder 32 is transmitted to the connecting portion 41e via the inner cylinder portion 41c. With this transmission, the connecting portion 41e is elastically deformed and therefore the elastic member 41 serves as a spring of the dynamic damper.

Here, since the connecting portion 41e is located at the intermediate portion of the longitudinal direction (front-rear direction) in between the inner cylinder portion 41c and the outer cylinder portion 41d, the movement of the bag holder 21 and the damper holder 42 is easily transmitted to the connecting portion 41e via the outer cylinder portion 41d or, the movement of the pin holder 32 is easily transmitted to the connecting portion 41e via the inner cylinder portion 41c. The connecting portion 41e is elastically deformed by being compressed in a radial direction so that the inner cylinder portion 41c and the outer cylinder portion 41d are substantially parallel to each other.

As a result, according to the third embodiment, the following effects are obtained, in addition to the above effects (1) to (5).

(6) The elastic member 41 used in the third embodiment includes the inner cylinder portion 41c mounted to the outside of the cylindrical portion 32a of the pin holder 32, the outer cylinder portion 41d surrounding the inner cylinder portion 41c and the connecting portion 41e that connects the intermediate portion in the longitudinal direction (front-rear direction) of the inner cylinder portion 41c to the intermediate portion in the longitudinal direction (front-rear direction) of the outer cylinder portion 41d and is perpendicular to the longitudinal direction (front-rear direction).

Therefore, the connecting portion 41e is likely to be elastically deformed by being compressed in the radial direction. As a result, the dynamic damper can be vibrated in an aimed damping direction and at an aimed damping frequency by tuning the thickness or the like of the connecting portion 41e.

Fourth Embodiment

Figure 16:
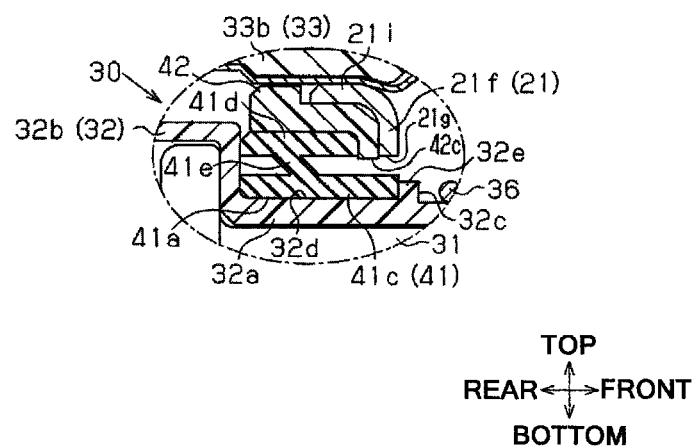
FIG. 16 shows a fourth embodiment of a vibration control structure for a steering wheel and is a partial sectional view showing a portion of a horn switch mechanism that is mounted to a bag holder.

Next, a fourth embodiment of a vibration control structure for a steering wheel will be described with reference to FIG. 16.

The fourth embodiment is different from the third embodiment (where the annular connecting portion 41e of the elastic member 41 is perpendicular to the longitudinal direction (front-rear direction)) in the respects that the annular connecting portion 41e of the elastic member 41 is inclined with respect to the longitudinal direction (front-rear direction), i.e., has a tapered shape. In the fourth embodiment, the connecting portion 41e has a tapered shape whose diameter is reduced toward the front side. A rear end portion of the connecting portion 41e is connected to the outer cylinder portion 41d and a front end portion of the connecting portion 41e is connected to the inner cylinder portion 41c at the front of the connecting site of the rear end portion with the outer cylinder portion 41d.

Other configurations are the same as in the third embodiment. Accordingly, the same or similar element will be denoted by the same reference numeral as that of the third embodiment and the duplicated explanation thereof will be omitted.

In the vibration control structure of the fourth embodiment configured as described above, the connecting portion 41e is elastically deformed by being compressed in the radial direction when the elastic member 41 is elastically deformed due to the vibration of the steering wheel 10. This point is the same as in the third embodiment. In addition to this, according to the fourth embodiment, the connecting portion 41e is elastically deformed by being bent to change an incline angle with respect to the longitudinal direction (front-rear direction). In this case, a repulsive force that is generated by the connecting portion 41e due to the elastic deformation becomes smaller, as compared to a case where the connecting portion 41e is elastically deformed by being compressed only in the radial direction. As a result, the connecting portion 41e is more likely to be elastically deformed.

As a result, according to the fourth embodiment, the following effects are obtained, in addition to the above effects (1) to (6).

(7) The connecting portion 41e of the elastic member 41 is inclined with respect to the longitudinal direction (front-rear direction).

Therefore, since the connecting portion 41e is compressed in the radial direction and also bent, the connecting portions 41e is more likely to be elastically deformed. An aimed damping frequency can be set to be lower by tuning the thickness or the like of the connecting portion 41e.

Each of the above-described embodiments may be realized as the following modifications.

<With Respect to Bag Holder 21>

The mounting portion 21f is not limited to those being perpendicular to the longitudinal direction (front-rear direction) but may be inclined thereto.

The clamping portion 21i may be provided at a site different from as in the above-described embodiments, as long as the site belongs to the peripheral portion of the mounting hole 21g.

The clamping portion 21i may be provided at three or more sites of the peripheral portion of the mounting hole 21g.

The clamping portion 21i may be configured by a separate member different from the mounting portion 21f.

<With Respect to Support Member>

Instead of the snap pin 31, a support member satisfying the following conditions may be used.

Condition 1: the support member is inserted through the through-hole 12c locked to the cored bar 12 by the clip 13.

Condition 2: the support member is support the bag holder 21 so as to be movable in the longitudinal direction (front-rear direction) relative to the cored bar 12 by being inserted through the bag holder 21.

Condition 3: the support member includes, on the rear side of the bag holder 21, a pressure receiving portion (collar portion 31a) for receiving a rearward biasing force by a biasing member (coil spring 36).

Condition 4: the support member is formed of a conductive metal and therefore a rear end surface (collar portion 31a) thereof can serve as a fixed-side contact part.

The collar portion 31a may be provided at a site different from the rear end portion thereof, as long as the site belongs to the portion of the snap pin 31 (support member) that is located in the rear of the mounting hole 21g of the bag holder 21.

<With Respect to Pin Holder 32 (Slider)>

The enlarged diameter portion 32b may be provided at a site that is located in the periphery of the pin holder 32 (slider) and is different from the rear end portion.

In the first embodiment, the recess 32d may be formed in the cylindrical portion 32a and the elastic member 41 may be mounted to the recess 32, similar to the second to fourth embodiments.

In the second to fourth embodiments, the recess 32d of the cylindrical portion 32a may be omitted, similar to the first embodiment.

<With Respect to Elastic Member 41>

The elastic members shown in the following FIG. 17A to (E) may be used as the elastic member 41 of the first embodiment.

Figure 17A:
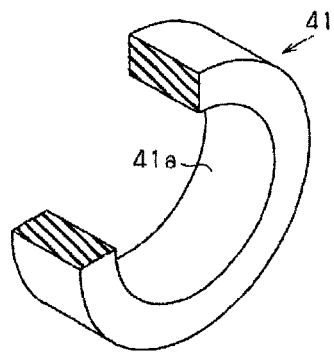
FIGS. 17A to 17E are partial perspective views showing a modification of the elastic member of the first embodiment, a portion of which is cut out.

FIG. 17A shows the elastic member 41 in which the recess 41b is not formed.

Figure 17B:
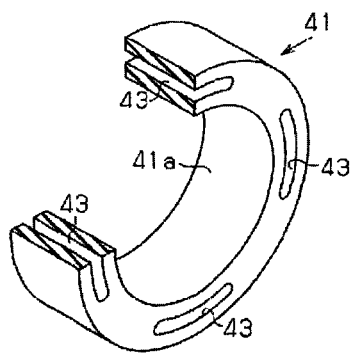

FIG. 17B shows the elastic member 41 in which long holes 43 are formed at multiple sites spaced apart from each other in a circumferential direction and each long hole 43 penetrates in a longitudinal direction (front-rear direction) and extends a circumferential direction.

Figure 17C:
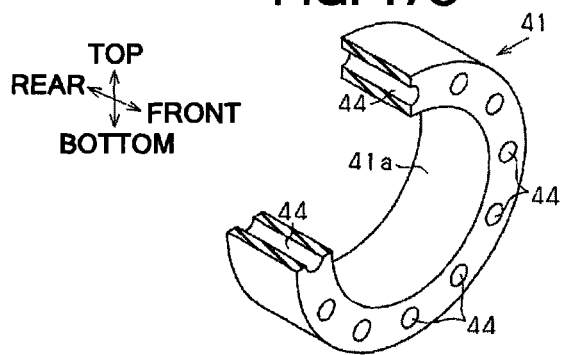

FIG. 17C shows the elastic member 41 in which round holes 44 are formed at multiple sites spaced apart from each other in a circumferential direction and each round hole 44 penetrates in a longitudinal direction (front-rear direction).

Figure 17D:
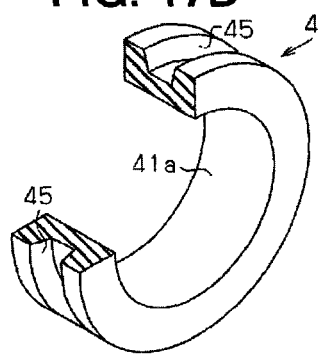

FIG. 17D shows the elastic member 41 in which an annular groove 45 is formed over the entire periphery and opened in an outer peripheral surface.

Figure 17E:
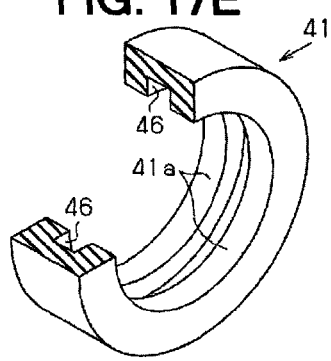

FIG. 17E shows the elastic member 41 in which an annular groove 46 is formed over the entire periphery and opened in an inner peripheral surface.

Preferably, the above-described various elastic members 41 may be suitably selected and used, depending on the characteristics required for the vibration control.

In the first embodiment, the groove 41b may be opened in not a front surface but a rear surface of the elastic member 41.

Sectional shape of the groove 41b may be changed to a sectional shape different from as in the first embodiment.

When the thickness in a radial direction of the elastic member 41 in the first embodiment is sufficiently large, the groove 41b may be provided at multiple sites in a radial direction of the elastic member 41.

Inner peripheral portions of the elastic member 41 in FIG. 17A to (E) may extend to the front and enter into the mounting hole 21g. By doing so, the same effect as the effect (4) in the second embodiment is obtained.

Although the connecting portion 41e has an annular shape in the third and fourth embodiments, a plurality of connecting portions 41e may be formed at multiple sites spaced apart from each other in a circumferential direction so as to form an annular shape as a whole. Also in this case, the plurality of connection portions 41e is disposed at the intermediate portion in the longitudinal direction (front-rear direction) of the inner cylinder portion 41c and the outer cylinder portion 41d.

As the elastic member 41e in the fourth embodiment, an elastic member may be used in which the inner cylinder portion 41c and the outer cylinder portion 41d are connected by the connecting portion 41e having a tapered shape whose diameter is increased toward the front side. Also in this case, the same effect as the effect (7) is obtained.

In the second to fourth embodiments, it is preferable that the front end surface of the inner cylinder portion 41c is located on the same surface as the front surface of the mounting portion 21f or in the front of the front surface, from the viewpoint of suppressing the contact of the inner wall surface of the mounting hole 21g with the cylindrical portion 32a. However, the front end surface may be located in the rear of the front surface of the mounting portion 21f, as long as the front end surface enters into the mounting hole 21g.

In the second to fourth embodiments, it is preferable that the connecting portion 41e is located at a center in a longitudinal direction (front-rear direction) of the outer cylinder portion 41d. However, the connecting portion 41e may be located within a certain area including the center in the longitudinal direction (front-rear direction).

<Others>

The vibration control structure may be applied to a steering wheel of a steering system in vehicular things other than a vehicle, for example, in an aircraft, vessel, etc.

What is claimed is:

1. A vibration control structure for a steering wheel comprising:
    a fixed member that is fixed to a steering shaft extending in a front-rear direction;
    an airbag device that is provided at a front portion thereof with a bag holder having a mounting hole and is disposed at a rear side of the fixed member;
    a horn switch mechanism that includes a support member supported by the fixed member in a state where the horn switch mechanism is inserted through the mounting hole and a slider disposed between the support member and the mounting hole so as to be slidable in the front-rear direction, the horn switch mechanism being adapted to actuate a horn device by a forward movement of the slider according to a pressing operation of the airbag device; and
    an annular elastic member that is disposed on the rear side of the bag holder while being mounted to the outside of the slider,
    wherein the airbag device serves as a damper mass of a dynamic damper and the elastic member serves as a spring of the damper mass, and
    the elastic member is sandwiched by the bag holder and the slider from a front side and a rear side thereof and from an outside and inside of the radial direction.

2. The vibration control structure for the steering wheel according to claim 1, wherein the bag holder includes a mounting portion disposed around the mounting hole and intersecting the bag holder along the front-rear direction,
    the slider includes a cylindrical portion through which the support member is inserted and an enlarged diameter portion formed in an outer periphery of the cylindrical portion and having a diameter greater than that of the cylindrical portion, and
    the elastic member is sandwiched by the mounting portion and the enlarged diameter portion from the front side and the rear side of the elastic member.

3. The vibration control structure for the steering wheel according to claim 1, wherein the bag holder includes a clamping portion extending from a peripheral portion of the mounting hole to the back side of the bag holder,
    the slider includes a cylindrical portion through which the support member is inserted, and
    the elastic member is sandwiched by the clamping portion and the cylindrical portion from the outside and inside of the radial direction of the annular elastic member.

4. The vibration control structure for the steering wheel according to claim 1, wherein a collar portion having a diameter greater than that of the mounting hole is formed at a site of the support member that is located on the rear of the mounting hole.

5. The vibration control structure for the steering wheel according to claim 1, wherein the horn switch mechanism is mounted to the bag holder by inserting the support member and the slider through the mounting hole in a state where the elastic member is mounted to the outside of the slider and,
    the vibration control structure for the steering wheel further comprising:
    a damper holder for holding the elastic member in a state of being mounted to the outside of the slider by being locked to the horn switch mechanism before the horn switch mechanism is mounted to the bag holder, the damper holder being located between the elastic member and the bag holder when the horn switch mechanism is mounted to the bag holder.

6. The vibration control structure for the steering wheel according to claim 1, wherein a portion of the elastic member enters into the mounting hole.

7. The vibration control structure for the steering wheel according to claim 1, wherein the elastic member includes an inner cylinder portion mounted to the outside of the slider, an outer cylinder portion surrounding the inner cylinder portion and a connecting portion connecting an intermediate portion in the front-rear direction (front-rear direction) of the inner cylinder portion to an intermediate portion in the front-rear direction of the outer cylinder portion.

8. The vibration control structure for the steering wheel according to claim 7, wherein the connecting portion is orthogonal to the front-rear direction.

9. The vibration control structure for the steering wheel according to claim 7, wherein the connecting portion is inclined with respect to the front-rear direction.

* * * * *